United States Patent
Little et al.

(10) Patent No.: US 9,609,856 B1
(45) Date of Patent: Apr. 4, 2017

(54) MULTI-LEVEL PROGRAMMABLE ALERTING SYSTEM

(71) Applicant: Bite Buddy, LLC, Kalama, WA (US)

(72) Inventors: Michael Little, Kalama, WA (US); GayLynn Little, Kalama, WA (US)

(73) Assignee: Bite Buddy, LLC, Kalama, WA (US)

( * ) Notice: Subject to any disclaimer, the term of this patent is extended or adjusted under 35 U.S.C. 154(b) by 111 days.

(21) Appl. No.: 14/789,868

(22) Filed: Jul. 1, 2015

(51) Int. Cl.
*A01K 85/01* (2006.01)
*A01K 97/12* (2006.01)
*A01K 87/00* (2006.01)
*G08B 21/18* (2006.01)

(52) U.S. Cl.
CPC ............ *A01K 97/125* (2013.01); *A01K 87/00* (2013.01); *G08B 21/18* (2013.01)

(58) Field of Classification Search
CPC ............................ A01K 97/125; A01K 87/007
USPC ............................................................. 43/17
See application file for complete search history.

(56) References Cited

U.S. PATENT DOCUMENTS

| | | | |
|---|---|---|---|
| 3,656,251 A | 4/1972 | Snider et al. | |
| 3,783,547 A | 1/1974 | Bystrom et al. | |
| 4,227,198 A | 10/1980 | Preskitt et al. | |
| 5,570,532 A | 11/1996 | Shaffer et al. | |
| 5,881,488 A | 3/1999 | Canepa | |
| 6,035,573 A | 3/2000 | Flores | |
| 6,253,483 B1 | 7/2001 | Reams | |
| 6,307,375 B1 | 10/2001 | Park | |
| 6,487,812 B2 | 12/2002 | Johnson | |
| 6,568,121 B1 | 5/2003 | Gonzales | |
| 6,708,441 B2 | 3/2004 | Dirito | |
| 6,816,434 B2 | 11/2004 | Jones | |
| 6,966,140 B1 | 11/2005 | Rozkowski | |
| 7,100,446 B1 | 9/2006 | Acar et al. | |
| 7,523,882 B2 | 4/2009 | Priednieks | |
| 7,562,488 B1* | 7/2009 | Perkins | A01K 97/125 43/17 |
| 7,624,531 B2 | 12/2009 | Kirby | |
| 7,832,271 B2 | 11/2010 | Mita et al. | |
| 7,934,338 B2 | 5/2011 | Hope | |
| 8,280,434 B2 | 10/2012 | Garg | |
| 8,302,343 B2 | 11/2012 | Carignan et al. | |
| 8,397,424 B2 | 3/2013 | Santiago et al. | |
| 8,429,970 B2 | 4/2013 | Rocchi | |

(Continued)

FOREIGN PATENT DOCUMENTS

| | | |
|---|---|---|
| EP | 1611787 A1 | 1/2006 |
| JP | 401296932 A | 11/1989 |

OTHER PUBLICATIONS

Texas Instruments, "2.4-GHz Bluetooth® low energy System-on-Chip," www.ti.com, Copyright © 2010-2013, Texas Instruments Incorporated, SWRS084F—Oct. 2010—Revised Jun. 2013, 35 pages.

(Continued)

*Primary Examiner* — Richard G Davis
(74) *Attorney, Agent, or Firm* — Law Office of Karen Dana Oster, LLC

(57) ABSTRACT

A multi-level programmable alerting system may be used with a fishing pole and a handheld device. The system includes a sensing device associatable with the fishing pole and an application associatable with the handheld device. The system detects and alerts an angler that fish are nibbling, biting, and/or striking.

19 Claims, 14 Drawing Sheets

(56) References Cited

U.S. PATENT DOCUMENTS

| | | | |
|---|---|---|---|
| 8,464,461 B1 | 6/2013 | Perkins et al. | |
| 8,553,501 B1 | 10/2013 | Cota | |
| 9,031,842 B2 | 5/2015 | Edgar et al. | |
| 9,049,577 B2 | 6/2015 | Fyke et al. | |
| 9,071,955 B2 | 6/2015 | Yamaoka et al. | |
| 2002/0088279 A1 | 7/2002 | Folkmer et al. | |
| 2006/0117638 A1* | 6/2006 | Park | A01K 97/125 43/17 |
| 2008/0066367 A1 | 3/2008 | Meeks et al. | |
| 2009/0090200 A1 | 4/2009 | Mita et al. | |
| 2009/0158635 A1* | 6/2009 | Hope | A01K 97/125 43/4.5 |
| 2009/0235572 A1* | 9/2009 | Pekin | A01K 89/00 43/17 |
| 2011/0061287 A1 | 3/2011 | Ogawa | |
| 2015/0113853 A1* | 4/2015 | McKeough | A01K 97/125 43/17 |

OTHER PUBLICATIONS

Apple Inc., "Core Bluetooth Programming Guide," Copyright © 2013 Apple Inc. All Rights Reserved, Sep. 18, 2013, 56 pages.
Maxim Integrated, "MAX21000 Ultra Accurate, Low Power, 3-Axis Digital Output Gyroscope," © 2013 Maxim Integrated Products, Inc., 19-6567, Rev 1, 2/13, 26 pages.
usprimetimes.com DRS, Data Retrieval Service, Rev. 1.11, © USPrimetimes, LLC, 2012, Sep. 18, 2012, Confidential, 8 pages.

* cited by examiner

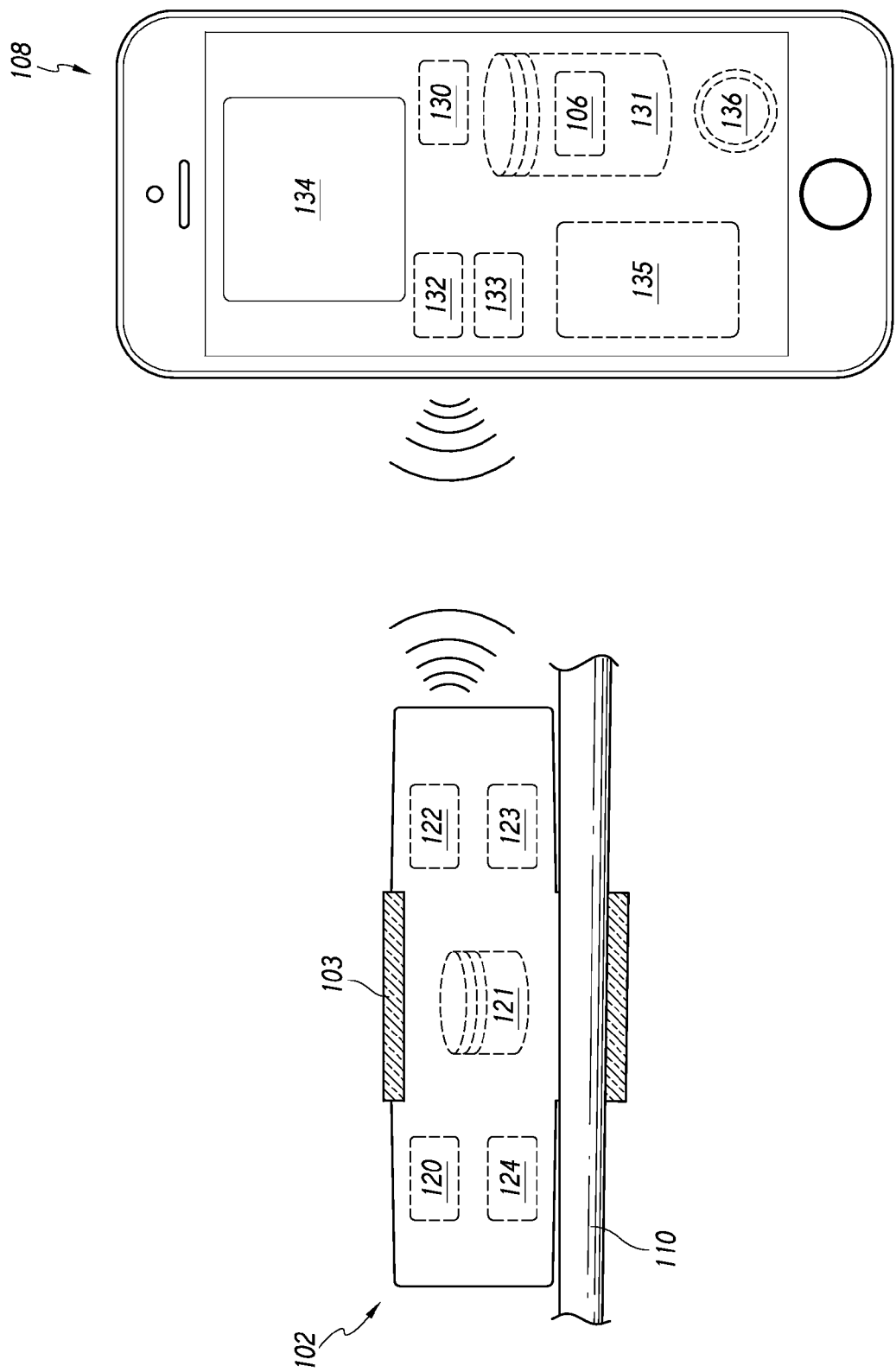

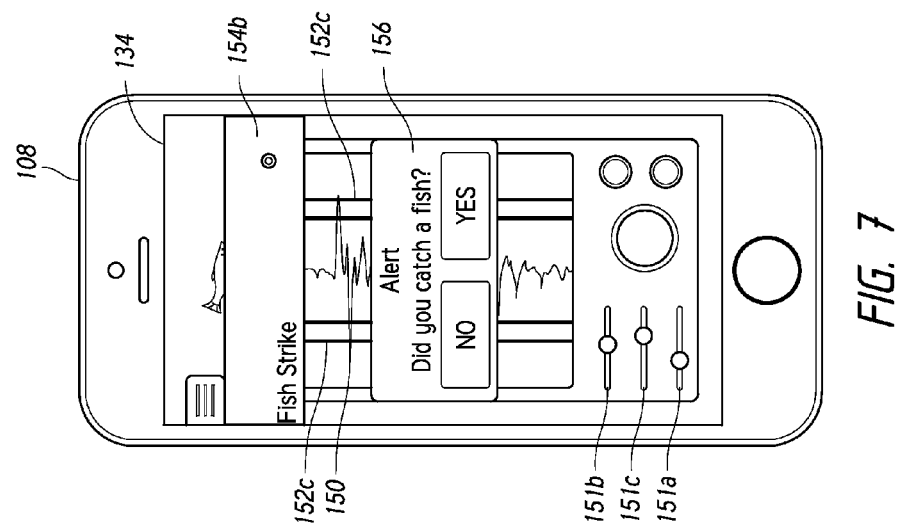

MULTI-LEVEL PROGRAMMABLE ALERTING SYSTEM

BACKGROUND OF THE INVENTION

Disclosed herein is a multi-level programmable alerting system. A preferred multi-level programmable alerting system is a system for detecting and alerting an angler that fish are nibbling, biting, and/or striking.

The history of fishing dates back to ancient man. In fact, fishing was a major source of food for ancient man. For example, isotopic analysis of the skeletal remains of the Tianyuan man, a 40,000 year old human from eastern Asia, showed that he regularly consumed freshwater fish. Another example is that, to catch their fish, ancient Egyptian fishermen fished both from the shore and from reed boats, using woven nets, weir baskets made from willow branches, and harpoons. By the 12th dynasty (1991-1778 B.C.), Egyptian fishermen were even using metal hooks with barbs. Yet another example of ancient fishermen is the Greco-Roman sea fishermen who were described in Oppian's *Halieutica*, a poem written around A.D. 180.

Nowadays, fishing is one of the most popular outdoor recreational activities in the United States, with more than 55 million Americans taking at least one fishing trip in 2013, according to Statista, the Statistics Portal. The American Sportfishing Association (ASA), the trade association that represents the sport fishing industry, released a study in January 2013 that reported that fishing's annual economic impact was $115 billion, with fishing supporting more than 828,000 jobs and generating $35 billion in wages and $15 billion in federal and state taxes.

The popularity of recreational fishing may be due, in part, to the fact that it can be done anywhere, at anytime, and by virtually anyone. An angler or a fisherman (the two terms are used synonymously herein) might fish from a boat, a dock, a beach, the bank of a river or lake, and/or from other prime fishing spots. Anglers can fish at night or during the day. Anglers can fish in the ocean, in rivers, in creeks, in lakes, and in streams. Some anglers fish when the water is smooth, some anglers fish when the water is choppy, and ice anglers fish when a lake is frozen over.

Pole fishing takes a lot of time and patience to wait for a fish to nibble the hook. Anglers, therefore, enjoy reading a book, playing games (e.g. chess, poker, cribbage, or other kinds of games) with fellow angler friends, solving a crossword puzzle, or participating in other activities. But sometimes an angler wants to take a walk, take a nap, or needs to use the facilities. But if an angler's eyes aren't on the fishing pole to observe the light nibble that would signal a fish on the line, he might miss the nibble, and miss the fish.

Many products have been developed to help signal anglers when they have a fish on the line. Early auditory alerting systems may have been a simple bell tied to the end of a pole that rang when the pole vibrated. Early visual alerting systems may have been bobbers that dipped down when a fish moved the hook and bait. Additional alerting systems are discussed in U.S. Pat. No. 3,656,251 to Snider et al. (the "Snider reference"), Japanese Patent No. 401296932A to Hiruko et al. (the "Hiruko reference"), U.S. Pat. No. 5,570,532 to Shaffer et al. (the "Shaffer reference"), U.S. Pat. No. 5,881,488 to Canepa (the "Canepa reference"), U.S. Pat. No. 6,035,573 to Flores, (the "Flores reference"), U.S. Pat. No. 6,253,483 to Reams (the "Reams reference"), U.S. Pat. No. 6,487,812 to Johnson (the "Johnson reference"), U.S. Pat. No. 6,568,121 to Gonzales (the "Gonzales reference"), U.S. Pat. No. 6,708,441 to Dirito (the "Dirito reference"), European Patent Application No. EP1611787A1 to Priednieks (the "Priednieks reference"), U.S. Pat. No. 6,966,140 to Rozkowski (the "Rozkowski reference"), U.S. Patent Publication No. 2008/0066367 to Meeks et al. (the "Meeks reference"), U.S. Pat. No. 7,523,882 to Priednieks (the "'882 reference"), U.S. Pat. No. 7,562,488 to Perkins et al. (the "Perkins '488 reference"), U.S. Pat. No. 7,624,531 to Kirby (the "Kirby reference"), U.S. Patent Application No. 2011/0061287 to Ogawa (the "Ogawa reference"), U.S. Pat. No. 7,934,338 to Hope (the "Hope reference"), U.S. Pat. No. 8,302,343 to Carignan et al. (the "Carignan reference"), and U.S. Pat. No. 8,464,461 to Perkins et al. (the "Perkins '461 reference").

BRIEF SUMMARY OF THE INVENTION

Disclosed herein is a multi-level programmable alerting system. A preferred multi-level programmable alerting system is a system for detecting and alerting an angler that fish are nibbling, biting, and/or striking.

Disclosed herein is a multi-level programmable alerting system for use with a fishing pole and a handheld device. The system includes a sensing device associatable with the fishing pole and an application associatable with the handheld device. The sensing device preferably has at least one orientation sensor for sensing the orientation of the fishing pole and translating it as a signal, and at least one transmitting module configured to transmit the signal. The handheld device preferably has at least one receiving module and at least one display module. The at least one receiving module is preferably configured to receive the signal from the at least one transmitting module of the sensing device. The signal is preferably graphically represented on the display module as a wave form.

The system further includes a user manipulatable sensitivity tuning control, a user manipulatable bite tuning control, and a user manipulatable strike tuning control. The user manipulatable sensitivity tuning control may be used to set a sensitivity limit. The sensitivity limit preferably is graphically represented on the at least one display module by a sensitivity line. The user manipulatable bite tuning control may be used to set a bite limit. The bite limit preferably is graphically represented on the at least one display module by at least one bite line. The user manipulatable strike tuning control may be used to set a strike limit. The strike limit preferably is graphically represented on the at least one display module by at least one strike line.

The system preferably issues a bite alert if the signal meets the bite limit and issues a strike alert if the signal meets the strike limit.

In one alternative system, the bite limit may be graphically represented on the at least one display module by a pair of bite lines, one bite line on each side of the sensitivity line. In another alternative system, the strike limit may be graphically represented on the at least one display module by a pair of strike lines, one strike line each side of the sensitivity line, and each strike line separated from the sensitivity line by a respective bite line.

In one alternative system, the bite alert may be adjustable to issue sooner by manipulating the bite limit (such manipulation graphically represented on the at least one display module by moving the at least one bite line closer to the sensitivity line), and the bite alert may be adjustable to issue later by manipulating the bite limit (such manipulation graphically represented on the at least one display module by moving the at least one bite line farther from the sensitivity line). In another alternative system, the strike alert may be adjustable to issue sooner by manipulating the strike limit (such manipulation graphically represented on the at least one display module by moving the at least one strike line closer to the sensitivity line), and the strike alert may be adjustable to issue later by manipulating the strike limit (such manipulation graphically represented on the at least one display module by moving the at least one strike line farther from the sensitivity line).

It should be noted that the at least one orientation sensor may be at least one gyro.

It should be noted that the system may issue a bite alert if the signal exceeds the bite limit and may issue a strike alert if the signal exceeds the strike limit.

It should be noted that the bite alert may be selected from the group of alerts consisting of an audible alert, a visual alert, and/or a tactile alert.

It should be noted that the strike alert may be selected from the group of alerts consisting of an audible alert, a visual alert, and/or a tactile alert.

The subject matter described herein is particularly pointed out and distinctly claimed in the concluding portion of this specification. Objectives, features, combinations, and advantages described and implied herein will be more readily understood upon consideration of the following detailed description of the invention, taken in conjunction with the accompanying drawings.

BRIEF DESCRIPTION OF THE SEVERAL VIEWS OF THE DRAWINGS

The accompanying drawings illustrate various exemplary multi-level programmable alerting systems and/or provide teachings by which the various exemplary multi-level programmable alerting systems are more readily understood.

FIG. 2 is a schematic view of the exemplary, preferred multi-level programmable alerting system including a sensing device and an application, the sensing device being shown as attached to an exemplary fishing pole and the application being shown installed on a handheld device.

FIG. 7 is a screen shot of the handheld device running the application, and specifically, asking if the fisherman caught the fish.

FIGS. 18-1 and 18-2 (jointly referred to as FIG. 18) show a circuit diagram of the exemplary, preferred sensing device.

FIG. 19 is a graphic waveform of an exemplary output of a gyro, the waveform graphically showing a fish taking several small bites (or nibbles), the hook being set, and the fish being reeled in.

FIG. 20 is a graphic waveform of an exemplary output of a gyro, the waveform graphically showing a fish taking first a small bite, then a larger bite, then the hook being set, and finally the fish being reeled in.

Figure 1:
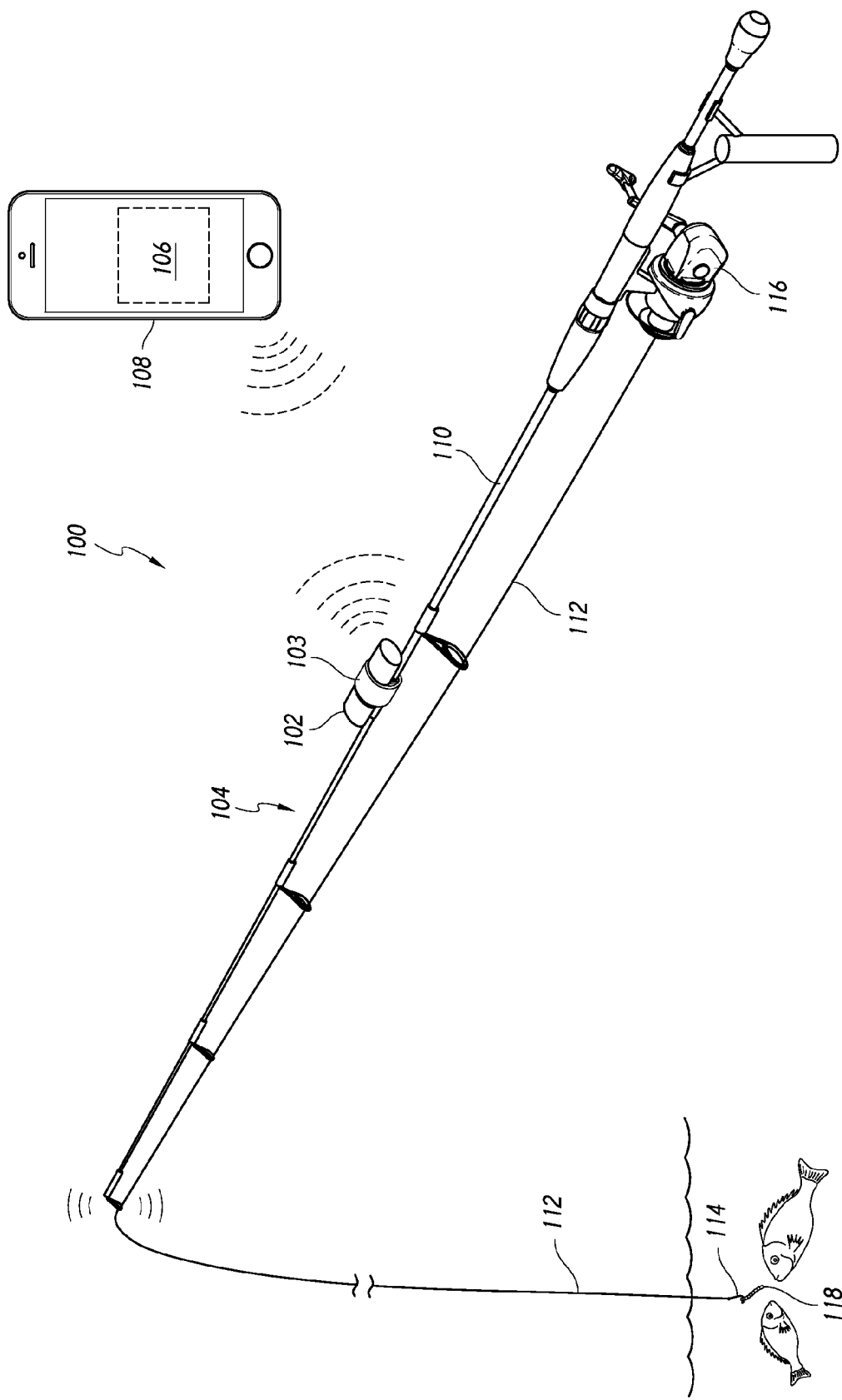
FIG. 1 is an environmental schematic view of an exemplary, preferred multi-level programmable alerting system including a sensing device and an application, the sensing device being shown as attached to an exemplary fishing pole and the application being shown installed on a handheld device.
Figure 3:
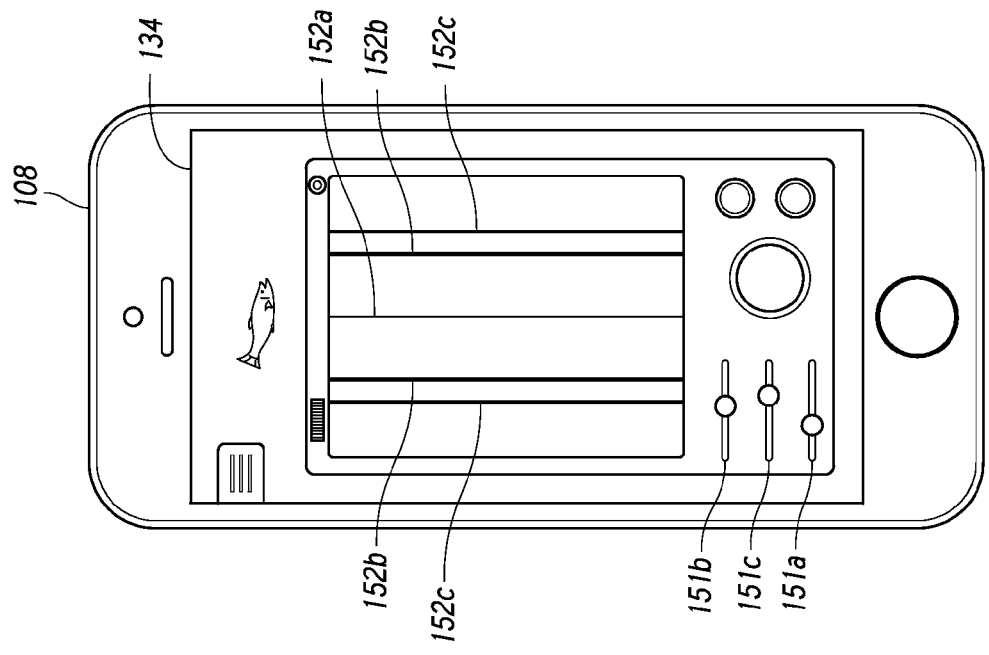
FIG. 3 is a screen shot of the handheld device running the application, and specifically, that the device is ready for the fisherman to begin fishing.
Figure 4:
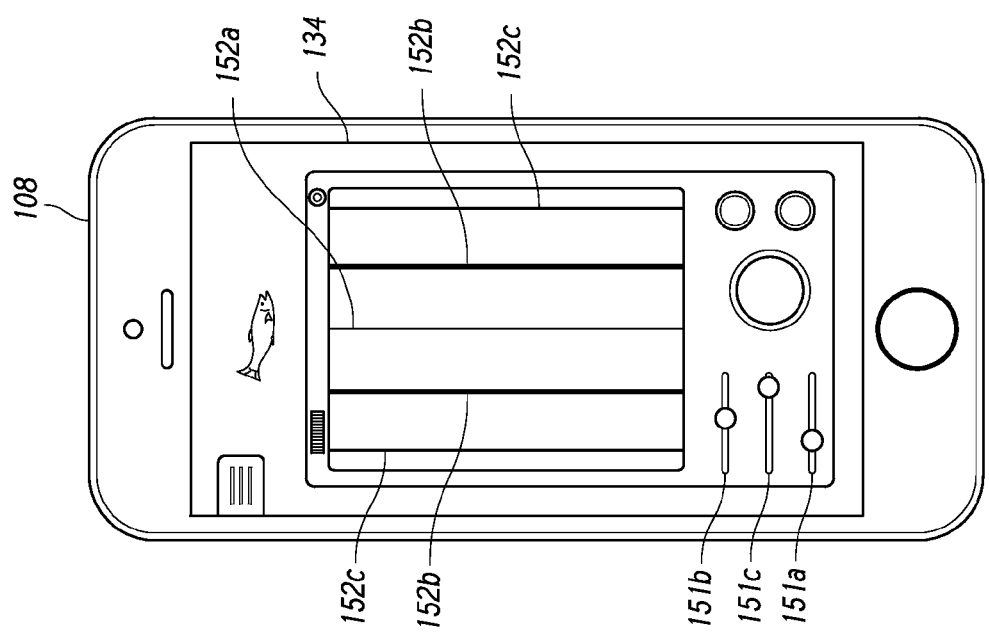
FIG. 4 is a screen shot of the handheld device running the application, and specifically, that the device has been more finely tuned than the device of FIG. 3, and is ready for the fisherman to begin fishing.

The drawing figures are not necessarily to scale. Certain features or components herein may be shown in somewhat schematic form and some details of conventional elements may not be shown or described in the interest of clarity and conciseness. The drawing figures are hereby incorporated in and constitute a part of this specification.

DETAILED DESCRIPTION OF THE INVENTION

Disclosed herein is a multi-level programmable alerting system 100 (generally referred to as "system 100"). A preferred multi-level programmable alerting system 100 is a system for detecting and alerting an angler that fish are nibbling and/or biting. The system preferably includes a sensing device 102 to be attached to a fishing pole 104 and an "application" 106 (e.g. a mobile application) associated with a handheld device 108 (e.g. a smartphone). The system 100 preferably alerts the angler of a fish nibble, bite, and/or strike of a fish bite when the sensing device 102 senses the nibble, bite, and/or strike, the sensing device 102 transmits the occurrence of the nibble/bite to application 106 via structure in the handheld device 108, and the application 106 causes the handheld device 108 to issue an alert in the form of an audible alert (e.g. a sound such as a buzzer or vocalization), a visual alert (e.g. a light), and/or a tactile alert (e.g. vibration).

The system 100 can be used to allow anglers to fish without concentrating on their fishing poles 104 and, in fact, the anglers can even take a nap, read a book, or even walk away from the pole 104. Because the handheld device 108 is preferably portable, it can be taken with the angler as he moves away from the pole 104. Further, because the handheld device 108 can preferably fit in his pocket and/or because of the customization options (e.g. different types of alerts), the angler won't be confused if someone else's system 100 provides an alert. For anglers who enjoy night fishing, the system 100 can be used in the dark of night. Just attach the sensing device 102 anywhere on the fishing pole 104, start the application 106 on the handheld device 108, set the tuning controls (sensitivity, bite, and strike), and wait for an alert.

Exemplary multi-level programmable alerting systems 100 may be better understood with reference to the drawings, but these multi-level programmable alerting systems 100 are not intended to be of a limiting nature unless specifically claimed. The same reference numbers will be used throughout the drawings and description in this document to refer to the same or like parts. The shown shapes and relative dimensions are preferred, but are not meant to be limiting unless specifically claimed, in which case they may limit the scope of that particular claim.

Definitions:

Before describing the multi-level programmable alerting system(s) 100 and the figures, some of the terminology should be clarified. Please note that the terms and phrases may have additional definitions and/or examples throughout the specification. Where otherwise not specifically defined, words, phrases, and acronyms are given their ordinary meaning in the art. The following paragraphs provide some of the definitions for terms and phrases used herein.

The phrase "alerting system" (referred to generally herein as the alerting system 100 or system 100) is meant to describe the combination of the sensing device 102 and the application 106. In general, the sensing device 102 will be attached to a fishing pole 104, as will be described herein. The application 106 is associated with a handheld device 108, as will be described herein.

The term "fish," when used as a noun, is meant to include any swimming animal that can be attracted to bait on a hook. This term is meant to be inclusive of non-traditional "fish" (e.g. octopuses or turtles, even if these are not the "fish" that the angler is seeking to catch) as well as traditional fish. When used as a verb, the term "fish" (and variations such as "fishing") is primarily used herein to describe the act of catching fish with a fishing pole 104. A fishing pole 104 (as shown in FIG. 1) may include and/or be associated with a rod 110 (e.g. a fishing rod), a line 112 (e.g. fishing line or fishing string), and a hook 114. The line 112 may be wound on a reel 116. The hook 114 may have bait 118 thereon. Although there are other types of fishing, the system described herein is preferably adapted to function with fishing with a fishing pole 104.

The phrase "sensing device 102" describes a physical device that senses the orientation of the sensing device 102 (and thereby the fishing pole 104 to which it is attached). The sensing device 102 may have associated hardware, software, and/or firmware (a variation, subset, or hybrid of hardware and/or software). The term "hardware" includes at least one processing module 120 (e.g. "processing unit," "processor," "computer," "programmable apparatus," and/or other known or yet to be discovered devices capable of executing instructions or steps). The sensing device 102 may also include modules (or submodules) including, but not limited to, at least one memory module 121 (memory), at least one transmitting module 122 (e.g. a Bluetooth® or WiFi™ transmitter), at least one receiving module 123 (e.g. a Bluetooth® or WiFi™ receiver), at least one orientation sensor 124 (e.g. a gyrometer or gyro), at least one position at least one power module (e.g. a battery—not shown), and at least one connector and/or path to facilitate interaction and/or communication between the modules. Optional modules include at least one display module, at least one input module, and at least one output module. (It should be noted that the modules may be combined into fewer modules (e.g. combining the transmitting module 121 and receiving module 123) and/or divided into more modules (e.g. multiple processing modules 120).) FIG. 2 shows some of the exemplary modules of the sensing device 102. The term "software" includes at least one "program," "subprogram," "series of instructions," or other known or yet to be discovered hardware instructions or hardware-readable program code. Software may be loaded onto the hardware (or firmware) to produce a machine, such that the software executes on the hardware to create structures for implementing the functions described herein. Further, the software may be loaded onto the hardware (or firmware) so as to direct the sensing device 102 to function in a particular manner described herein or to perform a series of operational steps as described herein. The phrase "loaded onto the hardware" also includes being loaded into memory (the memory module 121) associated with or accessible by the hardware. The term "memory" is defined to include any type of hardware (or other technology)-readable media (also referred to as machine-readable storage medium) including, but not limited to, internal storage media (e.g. RAM, ROM, EPROM, FLASH-EPROM, or any other memory chip or cartridge), attached storage media (e.g. hard disk drives, network disk drives, servers), removable storage media (e.g. flash drives, memory cards, CDs, DVDs, floppy disks, flexible disks), firmware, and/or other known or yet to be discovered storage media. Depending on its purpose, the memory may be transitory and/or non-transitory. Appropriate "communications," "signals," and/or "transmissions" (which include various types of information and/or instructions including, but not limited to, data, commands, bits, symbols, voltages, currents, electromagnetic waves, magnetic fields or particles, optical fields or particles, and/or any combination thereof) over appropriate "communication paths," "transmission paths," and other means for signal transmission including any type of connection between the sensing device 102 and the handheld device 108 would be used as appropriate to facilitate controls and communications.

The phrase "handheld device 108" is meant to describe a small computing or mobile device including, but not limited to, a smartphone (e.g. an Android® phone, Windows® phone, or iPhone®), a small computer (e.g. a tablet, notebook, or iPad), a personal digital assistant (PDA), a specially designed device having the properties described herein, or some other device known or yet to be discovered having the properties described herein. The handheld device 108 may have associated hardware, software, and/or firmware (a variation, subset, or hybrid of hardware and/or software). The term "hardware" includes at least one processing module 130 (e.g. "processing unit," "processor," "computer," "programmable apparatus," and/or other known or yet to be discovered devices capable of executing instructions or steps). The handheld device 108 may also include modules (or submodules) associated with known handheld devices including, but not limited to, at least one memory module 131 (memory), at least one transmitting module 132 (e.g. a Bluetooth® or WiFi™ transmitter), at least one receiving module 133 (e.g. a Bluetooth® or WiFi™ receiver), at least one display module 134 (e.g. a screen), at least one input module 135 (e.g. keys, buttons, sliders), at least one output module 136 (e.g. audible, visual, or tactile), at least one power module (e.g. a battery—not shown), and/or at least one connector and/or path (not shown) to facilitate interaction and/or communication between the modules. (It should be noted that the modules may be combined into fewer modules and/or divided into more modules.) FIG. 2 shows some of the exemplary modules of the handheld device 108. The term "software" includes at least one "program," "subprogram," "series of instructions," or other known or yet to be discovered hardware instructions or hardware-readable program code. Software may be loaded onto hardware (or firmware) to produce a machine, such that the software executes on the hardware to create structures for implementing the functions described herein. Further, the software may be loaded onto the hardware (or firmware) so as to direct the handheld device 108 to function in a particular manner described herein or to perform a series of operational steps as described herein. The phrase "loaded onto the hardware" also includes being loaded into the memory module associated with or accessible by the hardware. The term "memory" is defined as set forth herein (e.g. as in relation to the sensing device 102). Appropriate "communications," "signals," and/or "transmissions" (as set forth herein as set forth in relation to the sensing device 102) over appropriate "communication paths," "transmission paths," and other means for signal transmission including any type of connection between the sensing device 102 and the handheld device 108 would be used as appropriate to facilitate controls and communications.

The term "application 106" (also referred to as an application, an app, and/or a mobile application) is meant to describe a small, individual software unit designed to run on a handheld device 108. The specific application 106 described herein preferably has specific functions (or a subset of features) as described herein. The application 106 is preferably stored in the memory module of the handheld device 108. The application 106 may take advantage of the modules (e.g. those described above) and other features of the handheld device 108. For example, if the application 106 may take advantage of the transmitting module 132, receiving module 133, display module 134, input module 135, output module 136, and/or other modules associated with the handheld device 108. Another example is, if the handheld device 108 has a GPS module (an optional handheld device feature), the application 106 could use the location information. It should be noted that although the term "application" is used to describe the application 106, known and future technologies that could fulfill the functions described herein could be used instead of application technology.

The term "associated" is defined to mean integral or original, retrofitted, attached, connected (including functionally connected), positioned near, and/or accessible by. For example, if a transmitting module 132 and/or receiving module 133 is/are associated with a handheld device 108, the module(s) 132, 133 may be originally built into the handheld device 108, retrofitted into the handheld device 108, attached to the handheld device 108, nearby the handheld device 108, and/or accessible by the handheld device 108.

It should be noted that relative terms (e.g. primary and secondary) are meant to help in the understanding of the technology and are not meant to limit the scope of the invention. Similarly, unless specifically stated otherwise, the terms "first," "second," and "third" are meant solely for purposes of designation and not for order or limitation.

It should be noted that some terms used in this specification are meant to be relative. For example, the term "top" is meant to be relative to the term "bottom." The term "front" is meant to be relative to the term "back," and the term "side" is meant to describe a "face" or "view" that connects the "front" and the "back." Rotation of the system or component that would change the designation might change the terminology, but not the concept.

The terms "may," "might," "can," and "could" are used to indicate alternatives and optional features and only should be construed as a limitation if specifically included in the claims. For example, the phrase "the transmitting module(s) 122 and receiving module(s) 123 may be combined as a Bluetooth® transmitter/receiver" indicates that the combination is possible, but not required. It should be noted that the various components, features, steps, modules, or embodiments thereof are all "preferred" whether or not it is specifically indicated. Claims not including a specific limitation should not be construed to include that limitation.

Unless specifically stated otherwise, the term "exemplary" is meant to indicate an example, representative, and/or illustration of a type. The term "exemplary" does not necessarily mean the best or most desired of the type. It should be noted that, unless otherwise specified, the term "or" is used in its nonexclusive form (e.g. "A or B" includes A, B, A and B, or any combination thereof, but it would not have to include all of these possibilities). It should be noted that, unless otherwise specified, "and/or" is used similarly (e.g. "A and/or B" includes A, B, A and B, or any combination thereof, but it would not have to include all of these possibilities). It should be noted that, unless otherwise specified, the terms "includes" and "has" mean "comprises" (e.g. a device that includes, has, contains, or comprises A and B, but optionally may contain C or additional components other than A and B). It should be noted that, unless otherwise specified, the singular forms "a," "an," and "the" refer to one or more than one, unless the context clearly dictates otherwise.

Sensing Device

Figure 8:
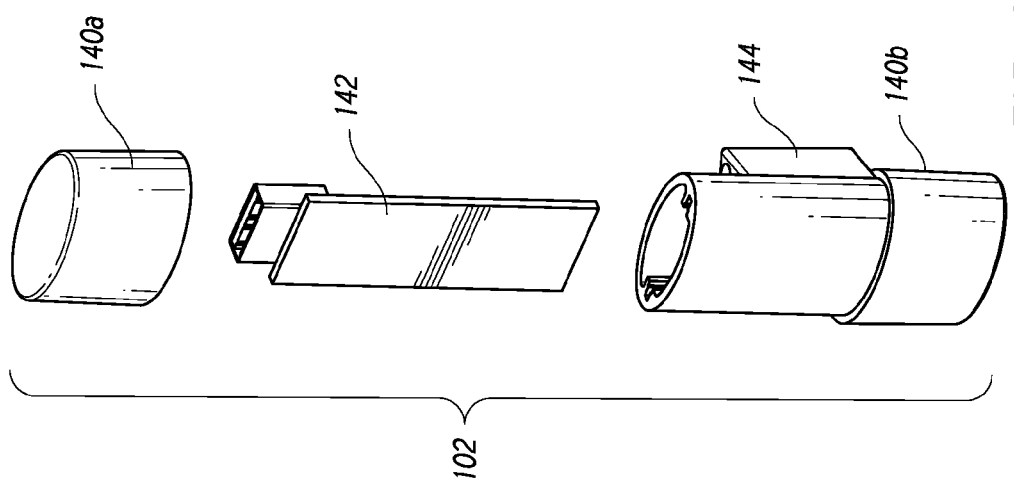
FIG. 8 is an exploded view of an exemplary housing and internal components of a sensing device of a multi-level programmable alerting system.
Figure 13:
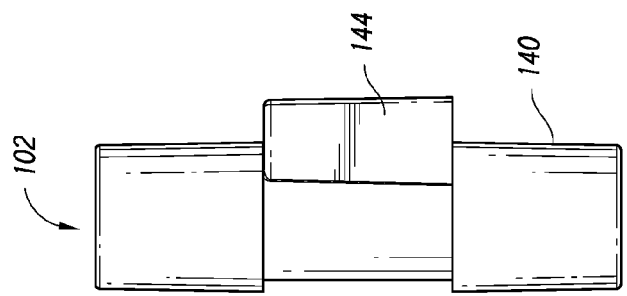
FIG. 13 is a first side view of the housing of FIG. 9, the second side view being a mirror image thereof.
Figure 15:
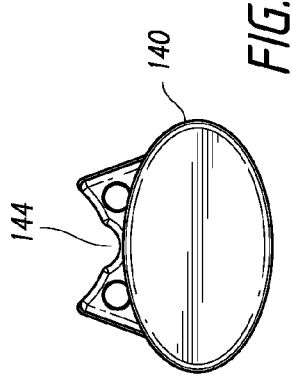
FIG. 15 is a back view of the housing of FIG. 9.
Figure 12:
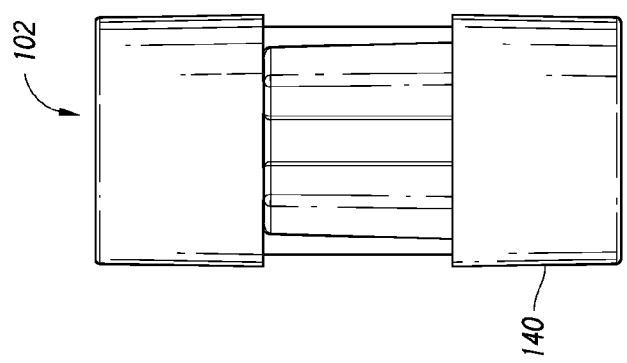
FIG. 12 is a back view of the housing of FIG. 9.
Figure 14:
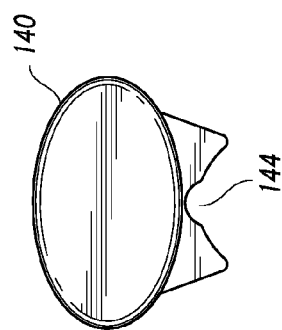
FIG. 14 is a top view of the housing of FIG. 9.
Figure 11:
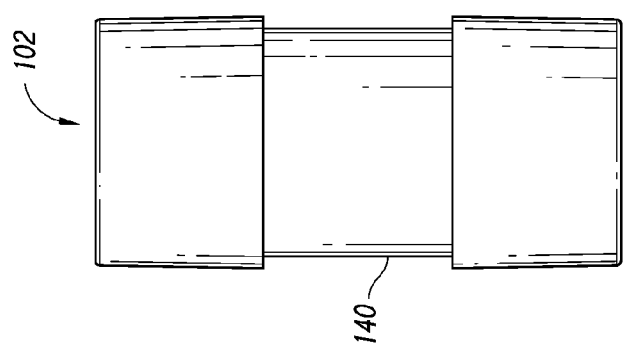
FIG. 11 is a front view of the housing of FIG. 9.
Figure 16:
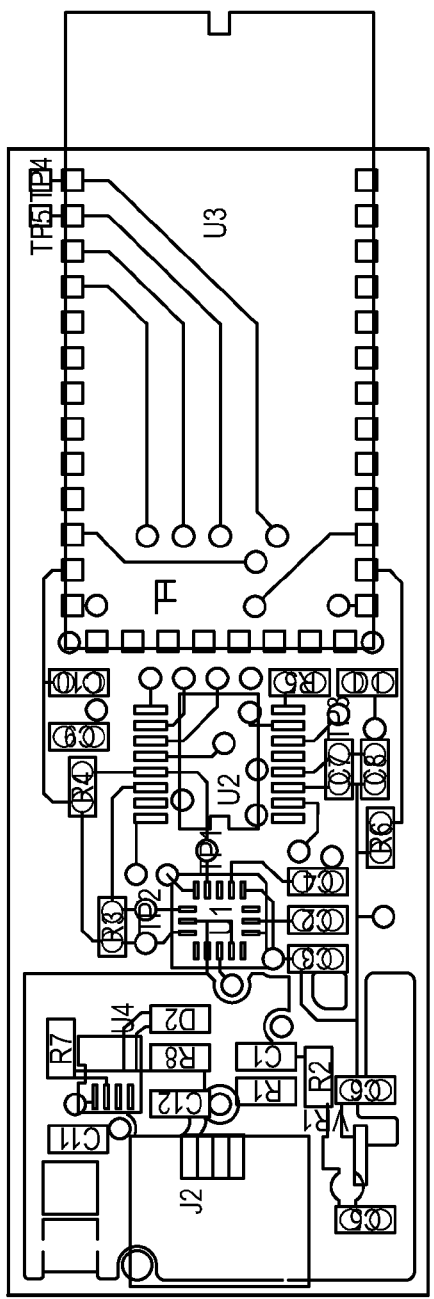
FIG. 16 is a top view of an exemplary, preferred circuit board of the sensing device.
Figure 17:
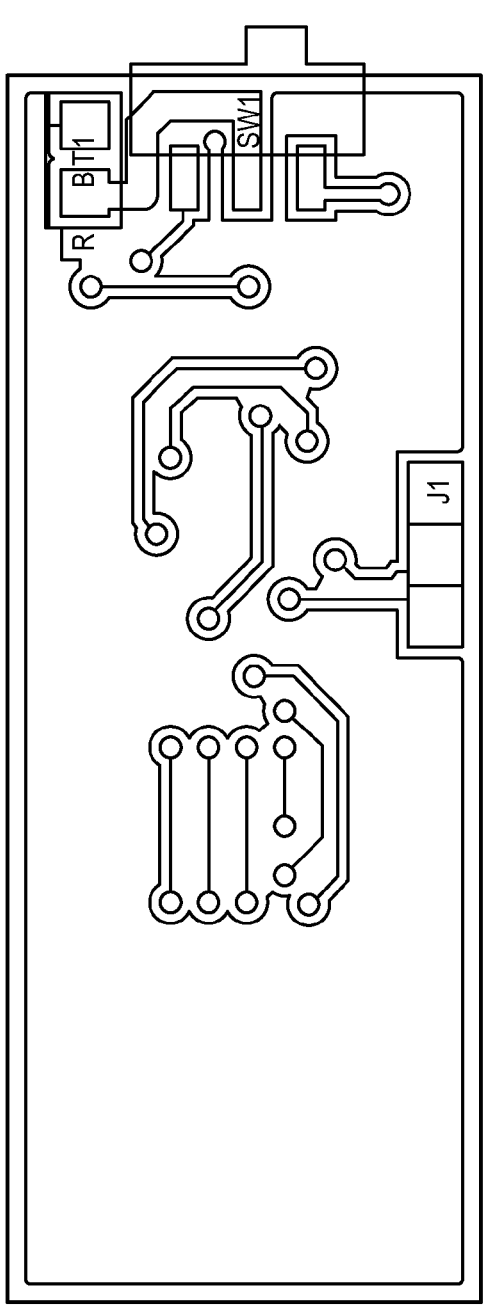
FIG. 17 is a bottom view of an exemplary, preferred circuit board of the sensing device.
Figures 1, 18:
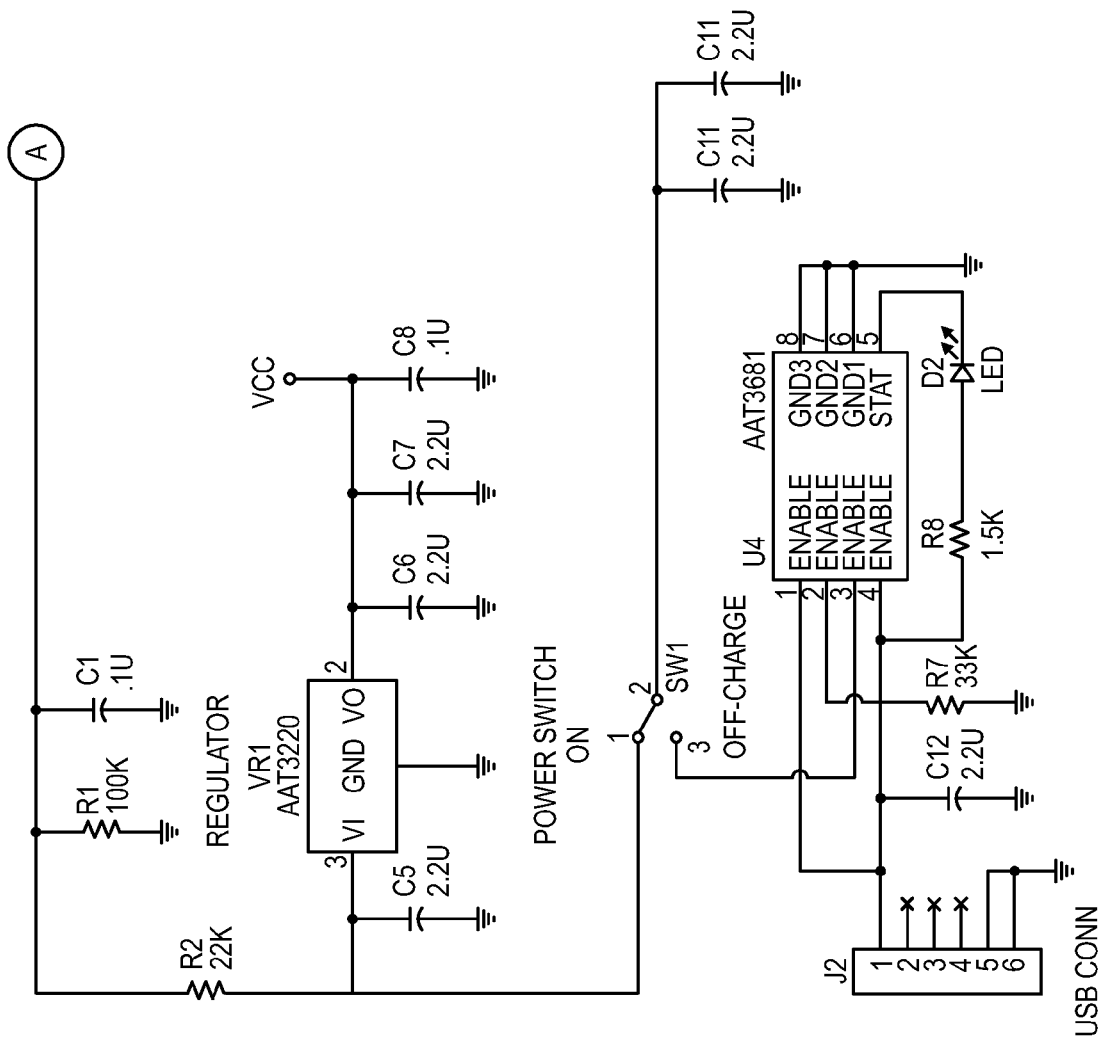
Figures 2, 18:
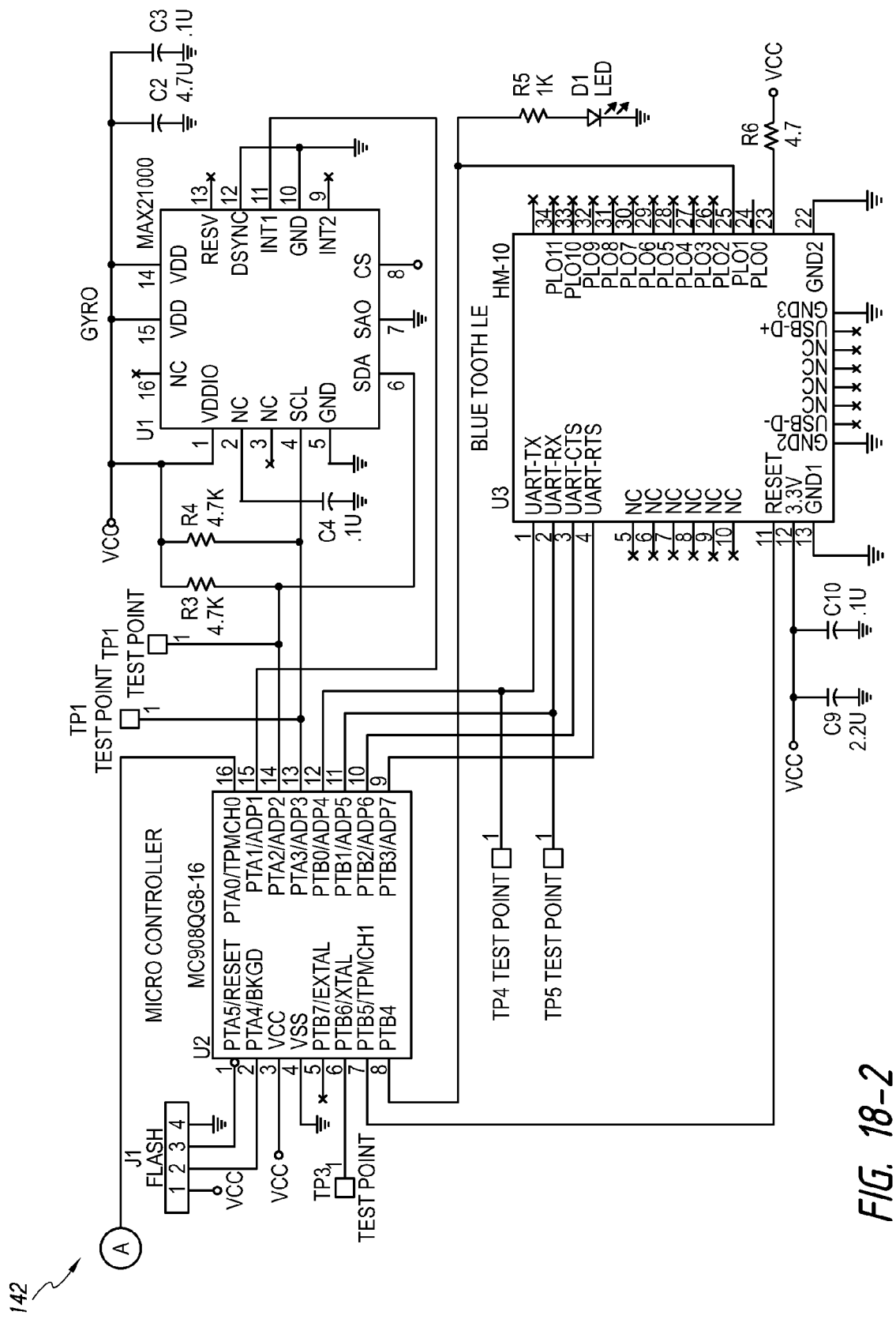

As shown in FIG. 8, the exemplary, preferred sensing device 102 includes a housing 140 that encloses hardware 142 (shown with exemplary basic modules 120, 121, 122, 123, and 124 in FIG. 2 and with more specific exemplary components in FIGS. 16-18, as discussed herein). The sensing device 102 is associated with the fishing pole 104 by, for example, attachment (shown) or integration (e.g. integrated into the handle of a fishing pole 104 by the manufacturer).

The hardware 142 may be programmed to cause the hardware 142 to function in intended ways. The processing module(s) 120 may be used to direct at least some of the remainder of the modules (and other components) to function in these intended ways. The memory module(s) 121, which is preferably accessible by the processing module(s)

120, may include programming (e.g. instructions, software, embedded software) that instructs the at least one processing module 120 on how to direct at least some of the remainder of the modules (and other components) to function in these intended ways.

Figure 6:
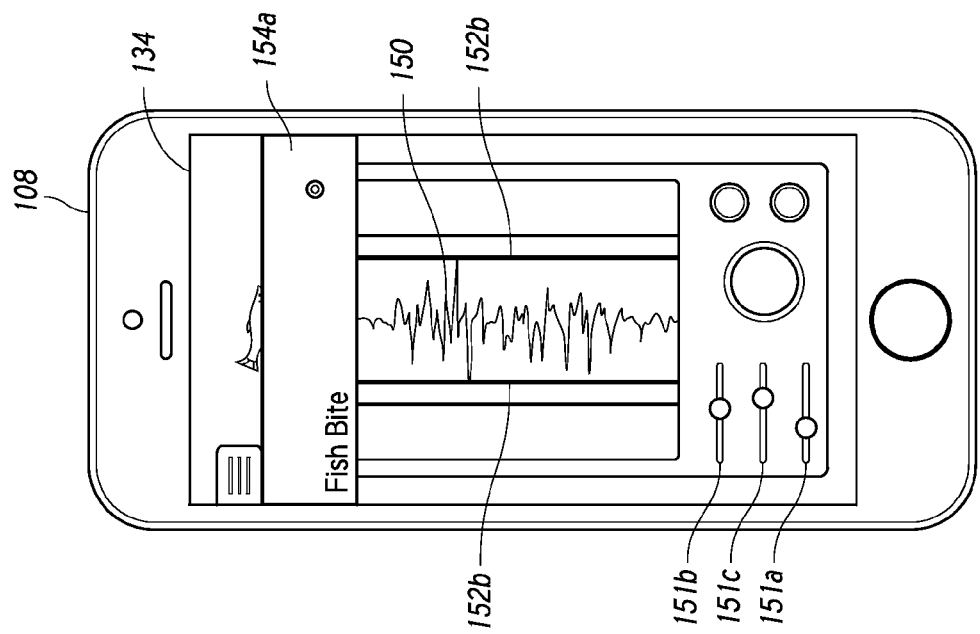
FIG. 6 is a screen shot of the handheld device running the application, and specifically, showing a fish is biting on the hook.
Figure 5:
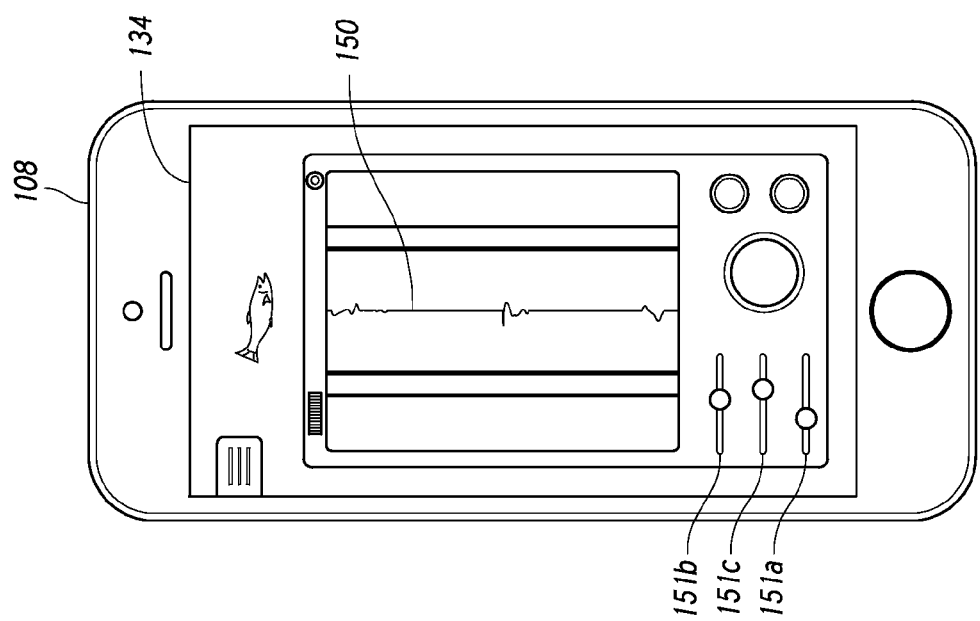
FIG. 5 is a screen shot of the handheld device running the application, and specifically, showing the device indicating that a fish is nibbling on the hook.
Figure 10:
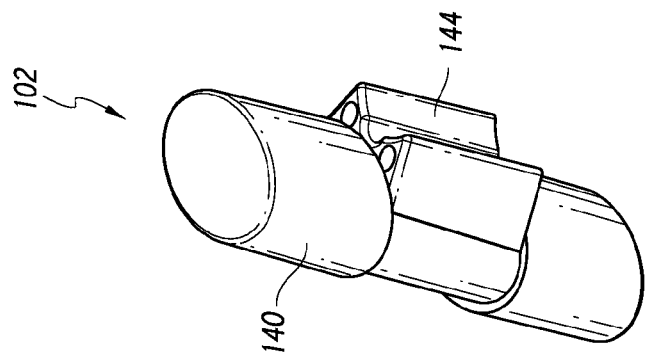
FIG. 10 is an alternative perspective view of the housing of FIG. 9 that shows the back of the housing.
Figure 9:
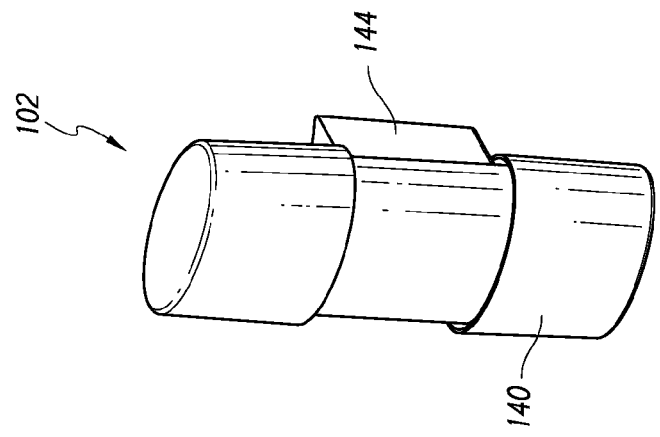
FIG. 9 is a perspective top view of an exemplary housing of a sensing device of a multi-level programmable alerting system.
Figure 19:
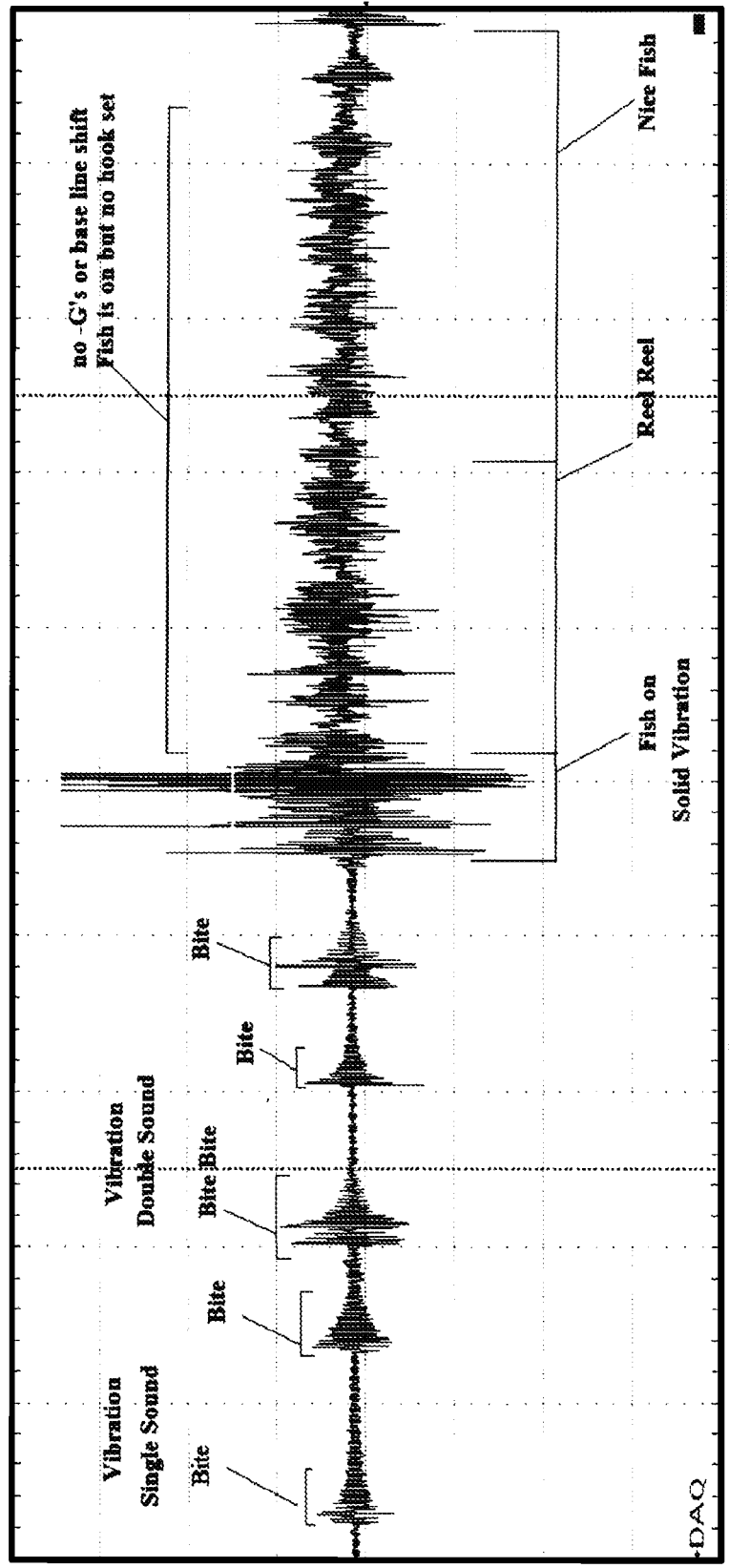
Figure 20:
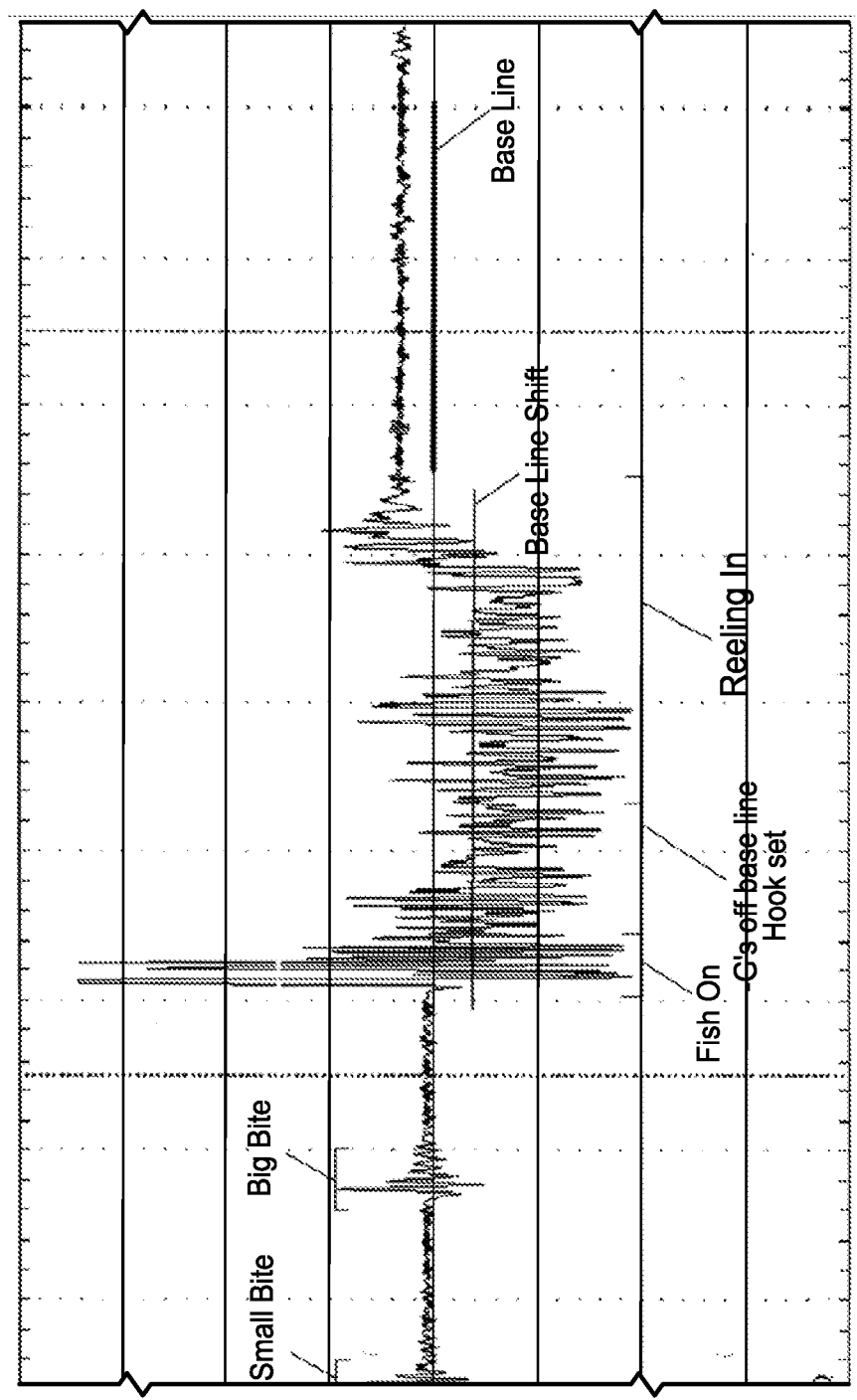
Figure 21:
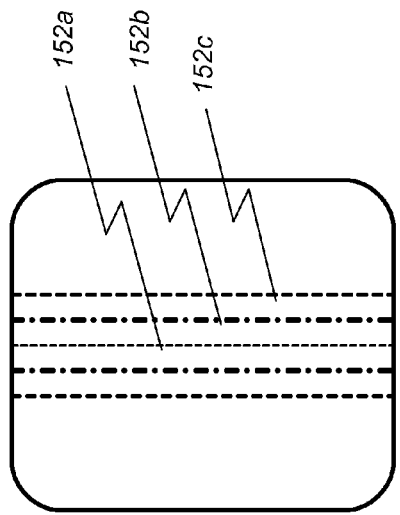
FIG. 21 is a partial screen shot showing the central line, bite lines, and strike lines in a first exemplary configuration.
Figure 22:
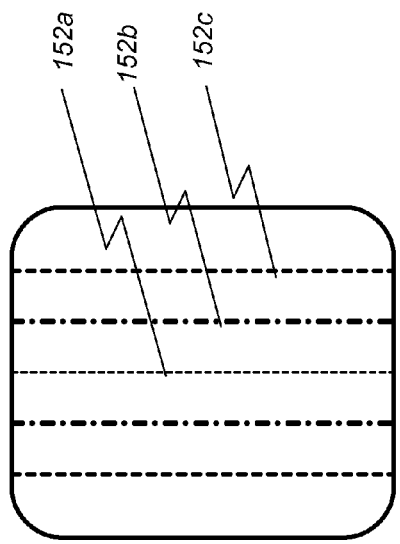
FIG. 22 is a partial screen shot showing the central line, bite lines, and strike lines in a second exemplary configuration.
Figure 24:
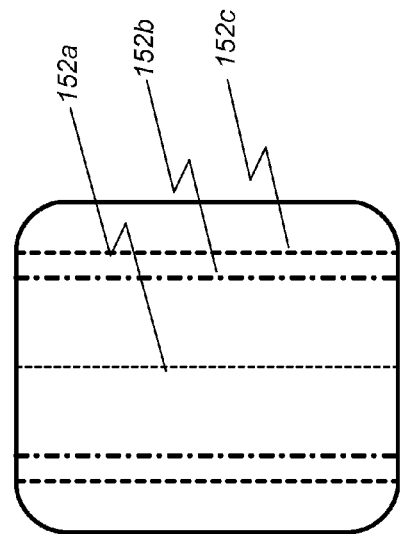
FIG. 24 is a partial screen shot showing the central line, bite lines, and strike lines in a fourth exemplary configuration.
Figure 23:
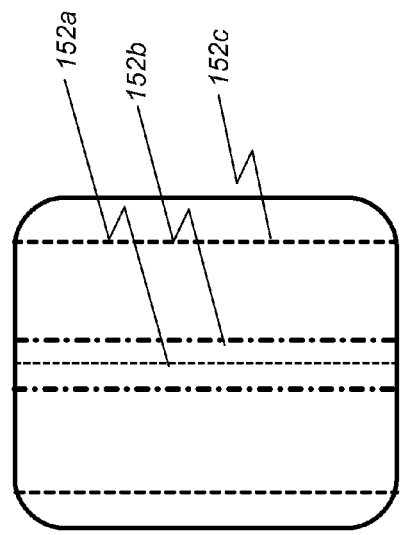
FIG. 23 is a partial screen shot showing the central line, bite lines, and strike lines in a third exemplary configuration.

The orientation sensor(s) 124 translate(s) the orientation of the fishing pole 104 into a signal that can be graphically represented as a waveform similar to a seismograph waveform (FIGS. 19 and 20). Small changes in orientation are represented as small changes (waves or bumps) in the waveform (FIG. 5). Medium changes in the orientation are represented as medium changes (waves or bumps) in the waveform (FIG. 6). Large changes in orientation are represented as large changes (waves or bumps) in the waveform (FIG. 7). The signal from the orientation sensor(s) 124 is transmitted to the handheld device 108 and displayed on the display module(s) 134 as a waveform 150. The orientation sensor(s) 124 is preferably a gyro. A gyro measures rate of rotation around a particular axis. Put another way, a gyro measures angular velocity, how fast something is spinning about an axis. Gyros allow for the calculation of orientation and rotation, allowing for an accurate recognition of movement within a 3D space. Exemplary gyros that may be used include those shown and discussed in U.S. Pat. No. 7,100,446 to Acar et al. (the "Acar reference"), U.S. Pat. No. 7,832,271 to Mita et al. (the "Mita reference"), U.S. Pat. No. 8,429,970 to Rocchi (the "Rocchi reference"), and U.S. Patent Application Publication No. 2002/0088279 to Folkmer et al. (the "Folkmer reference). Alternatively, the orientation sensor(s) 124 may be an accelerometer. Accelerometers are used to sense both static (e.g. gravity) and dynamic (e.g. sudden starts/stops) acceleration. An accelerometer may not provide enough information to know exactly how an object in motion is oriented.

The transmitting module(s) 122 and receiving module(s) 123 may be combined as a Bluetooth® transmitter/receiver. Functioning as a transmitter, the Bluetooth® transmitter/receiver transmits the signal from the orientation sensor(s) 124 to the handheld device 108 (specifically to the receiving module(s) 133 thereof). Functioning as a receiver, the Bluetooth® transmitter/receiver may be able to receive signals from the handheld device 108 (specifically to the display module(s) 134 thereof). Exemplary signals from the handheld device 108 may include start signals, stop signals, and reset signals. Exemplary receiving modules include those described in U.S. Pat. No. 8,280,434 to Garg (the "Garg reference"), U.S. Pat. No. 9,031,842 to Edgar et al. (the "Edgar reference"), U.S. Pat. No. 9,049,577 to Fyke et al. (the "Fyke reference") and U.S. Pat. No. 9,071,955 to Yamaoka et al. (the "Yamaoka reference").

The housing 140 shown in FIGS. 8-15 is meant to be exemplary and may take alternative forms. The shown housing 140 has two parts including a top 140a (shown as a cap) and a bottom 140b (shown as a body) (FIG. 8). As shown, the hardware 142 may be inserted into the interior formed by the top 140a and the bottom 140b of the housing 140. Once the hardware 142 is within the housing 140, the housing is preferably watertight. The watertight feature may be accomplished by known methods and devices such as rubber O-rings or gaskets. (In addition components such as a USB charging port preferably have a rubber plug to keep the system watertight.) The shown housing 140 also includes a "seat" 144. The seat 144 is meant to cradle the rod 110. The actual design of the seat 144 may be modified, for example, to mate with different types/sizes of rods 110, to work in conjunction with different types of attachment mechanisms, and/or to provide additional features (e.g. the addition of a rubber pad or gripping surface). The seat 144 is optional or unnecessary for certain types of attachment mechanisms. One alternative housing (not shown) would have the physical appearance of the handle of a fishing pole if the sensing device 102 was integrated into the handle of a fishing pole 104 by the manufacturer.

If the sensing device 102 is associated with the fishing pole 104 by attachment, the actual attachment may be accomplished using attachment mechanisms such as a band or strap 103 (FIGS. 1 and 2), a clip, a clamshell housing, and/or other means for attachments known or yet to be discovered. The strap 103 may be a hook-and-loop fabric (e.g. VELCRO®) that wraps around the rod 110 and then comes back to interconnect with itself and/or the housing 140. This may include a cinching action. In one preferred attachment scheme, once the strap 130 is wrapped around the rod 110 and is holding the sensing device 102 in place, the taper of the rod 110 may be used to further secure the sensing device 102 to the rod 110 because it can be pushed (slid) toward wider (greater diameter) areas of the rod 110 for further tightening the mount. The sensing device 102 should be secured in a very close relationship with the rod 110 so that there is little or no movement therebetween. This makes it possible for the sensing device 102 to sense movement, position, and/or orientation of the rod 110.

If the sensing device 102 is attached to (as opposed to integrated with) the fishing pole 104, it may be attached at almost any location desired by the angler. As a general rule, however, for a bigger rod 110, the sensing device 102 might be positioned more toward the middle of the rod 110. For a smaller rod 110, the sensing device 102 might be positioned more toward the bottom (e.g. near where the reel 116 is set) of the rod 110. The angler would be able to make adjustments based on factors or combinations of factors including, but not limited to, the angler's preferences, the angler's skill, the physical characteristics of the rod 110 (e.g. length, width, flexibility, material, strength, action), the sensitivity of the rod 110, and/or the fishing conditions (e.g. calmness/roughness of the water, weather).

FIGS. 2 and 16-18 provide differing amounts of detail of the exemplary hardware 140 of exemplary sensing devices 102. FIG. 2 shows at least one processing module 120, at least one memory module 121, at least one transmitting module 122, at least one receiving module 123, and at least one orientation sensor 124. FIGS. 16 and 17 show additional detail and/or variations compared to FIG. 2. FIG. 18 shows additional detail and/or variations compared to FIGS. 16 and 17. The at least one orientation sensor 124 of FIG. 2 may be compared to part U1 of FIGS. 16-18. U1 may be, for example, a 3.5V Maxim gyro, part number MAX21000+. The at least one processing module 120 of FIG. 2 may be compared to part U2 of FIGS. 16-18. U2 may be, for example, a 3.5V Freescale microcontroller, part number MC9S08QG4CDTE. The at least one transmitting module 122 and at least one receiving module 123 (taken together) of FIG. 2 may be compared to part U3 of FIGS. 16-18. U3 may be, for example, a 3.5V Bluetooth® LE Module by Jinan Huamao Technology Limited Company, part number HM-10. An ON/OFF mechanism (e.g. switch or button such as part SW1, which may be a C&K SPDT slide switch, part number JS102011SAQN) may be positioned on the circuit board. (To turn off the sensing device 102, the user would remove the top 140a and manipulate the ON/OFF mechanism. Alternatively, the ON/OFF mechanism may be positioned to be accessible from the outside of the housing 140. Known and yet to be discovered waterproofing mechanisms would be used to protect the hardware 142.) The at least one memory module 121 of FIG. 2 may be incorporated into (or accessible by) the other shown components and/or may be a standalone component. The sensing device of FIGS. 16-18 may also include additional components including, but not limited to, representational (and not necessarily exact) parts including the following: at least one printed circuit board (e.g. two layer PCB rev X having part number 30-1027); at least one power supply (e.g. a LiPO 3.7V single cell battery, a 5V battery charger (shown as part U4) having part number AAT3681 AIJS-4.2-T1 by Skyworks, and an FCI micro USB-B connector (shown as part J2) with part number 10118192-0001LF); at least one regulator (e.g. a Skyworks 3.3V regulator having part number AAT3220IGY-3.3-T1 (shown as part VR1)); at least one LED (e.g. an LED by OSRAM having part number LGQ971-KN-1); at least one capacitor (e.g. ceramic capacitor X7Rs such as 6.3V by Murata (GRM188R60J475KE19D), 6.3V by TDK (C1608X5R0J225K080AB), and TDK 25V (C1608X7R1E104M080AA)); resistors (e.g. Bournes 1/10 W resistors having parts numbers CR0603-JW-102ELF, CR0603-JW-152ELF, CR0603-JW-472ELF, CR0603-JW-223ELF, CR0603-JW-333ELF, and CR0603-JW-104ELF).

Application

FIGS. 3-7 show a visual representation of the application 106 running on the handheld device 108. The application 106 is "run" (activated so that appropriate programmed instructions are carried out) so as to be displayed on the at least one display module 134 of the handheld device 108. A set of tuning controls 151 provide input to the application 106. (Although shown as tuning controls 151 that are graphically represented on the display module 134 and interacted with using touch capabilities of the display module 134, the tuning controls 151 could be physical sliders or other input devices associated with the handheld device 108.) The tuning controls 151 (shown as sensitivity tuning control 151*a*, bite tuning control 151*b*, and strike tuning control 151*c*) may be used to control the "sensitivity" (central line 152*a*), "bite" (bite lines 152*b*), and "strike" (strike lines 152*c*). Put another way, the set of user manipulatable tuning controls 151 (shown as sensitivity tuning control 151*a*, bite tuning control 151*b*, and strike tuning control 151*c*) may be used to set the sensitivity limit 154*a* (FIG. 25) (which is graphically represented by the sensitivity or central line 152*a*), bite limit 154*b* (FIG. 25) (which is graphically represented by the bite lines 152*b*), and strike limit 154*c* (FIG. 25) (which is graphically represented by the strike lines 152*c*). The shown slider controls 151 are meant to be exemplary and could be shown, for example, as knobs, numbers, colors, or any other visual representation that allows control of a variable between and including two extremes. The visual representations 152 of the "sensitivity" (central line 152*a*), "bite" (bite lines 152*b*), and "strike" (strike lines 152*c*) are also meant to be exemplary. For example, the lines 152 may be horizontal rather than vertical, there may be only a single bite line 152*b* and strike line 152*c*, and/or any other visual representation of a base point, a first limit, and a second limit. It should be noted that the tuning controls 151 may be used to adjust the visual representations 152 at (at least) most times and not just at an early, initial stage. This allows the angler to make changes to reflect the particular conditions he is then experiencing.

The sensitivity tuning control 151*a* (which is shown as a software slider) controls the central line 152*a* (the baseline and/or waveform 150). Although the visual representation may not change, the sensitivity tuning control 151*a* allows the angler to set, for example, a "baseline" below which "activity" (e.g. bites and strikes) will not be reported to the angler (e.g. there will not be an alert). The sensitivity would be set at a first extreme if the conditions were perfectly still (e.g. the water was still, there was no wind, and the pole was being fixed in a stable place) and at a second extreme if the conditions were very "rocky" (e.g. the water was rough or choppy, there was wind, and the pole was on a boat and/or being held by the angler). At the first extreme, if there is any change in the pole's orientation (as sensed by the orientation sensor(s) 124 of the sensing device 102), the change is reported (e.g. in the form of "waves" in the waveform 150). At the second extreme, a significant amount of change in the pole's orientation (as sensed by the orientation sensor(s) 124 of the sensing device 102), would be needed before the change is reported (e.g. in the form of "waves" in the waveform 150). If the conditions were between perfectly still and very rocky, the sensitivity tuning control 151*a* would be set at an intermediate point. The angler could base the point at which the sensitivity tuning control 151*a* was set based on, for example, experimentation and/or experience.

Whereas very small changes in orientation (represented, for example, in FIG. 5) might be caused, for example, by the wake from a passing boat or a fish nibbling the bait, larger (medium) changes in orientation might represent a fish more aggressively biting at the bait. An angler would most likely want to be alerted to such biting activity. The bite tuning control 151*b* (which is shown as a software slider) effects the two parallel lines 152*b* (the "bite lines 152*b*") on either side of the central line 152*a* (the baseline and/or at least the central part of the waveform 150). Manipulating the bite tuning control 151*b* causes the bite lines 152*b* (the visual representation of the point at which a bite is reported to the angler) to move inward toward the central line 152*a* and/or outward away from the central line 152*a*. When the orientation sensor(s) 124 senses the predetermined amount of "activity" (e.g. change of orientation) represented by the bite lines 152*b* (and set by the angler), a "bite" is reported to the angler in the form of an alert (e.g. a visual alert 154*a* as shown in FIG. 6, an audible alert, and/or a tactile alert). Visually, the angler is alerted when the waveform 150 meets (touches) or exceeds (crosses) the bite lines 152*b*. FIGS. 3, 4, and 21-24 show variations of where the bite lines 152*b* may be set. Variations showing the bite lines 152*b* closer to the central line 152*a* (e.g. FIGS. 22 and 23) would alert the angler of a fish bite sooner (when the changes in orientation are smaller, perhaps even including the nibbles mentioned above) than variations showing the bite lines 152*b* at a middle distance to the central line 152*a* (e.g. FIGS. 3, 4, and 21). Variations showing the bite lines 152*b* farther from the central line 152*a* (e.g. FIG. 24) would alert the angler of a fish bite later (when the changes in orientation are greater, representing extremely aggressive biting) than variations showing the bite lines 152*b* at a middle distance to the central line 152*a* (e.g. FIGS. 3, 4, and 21). (It should be noted that the bite lines 152*b* are always between the central line 152*a* and respective (left/right) strike lines 152*c*.) The angler could base the point at which the bite tuning control 151*b* was set based on, for example, experimentation and/or experience.

Whereas "biting" changes in orientation (represented, for example, in FIG. 6) might be caused, for example, by a fish biting at the bait, large changes in orientation might represent a fish striking and, effectively getting caught. An angler would definitely want to be alerted to such striking activity. The strike tuning control 151*c* (which is shown as a software slider) effects the two parallel lines 152*b* (the "strike lines 152*c*") on the sides of the bite lines 152*b* opposite central line 152*a* (and/or at least the central part of the waveform 150). Manipulating the strike tuning control 151c causes the strike lines 152c (the visual representation of the point at which a strike is reported to the angler) to move inward toward the central line 152a and/or outward away from the central line 152a. When the orientation sensor(s) 124 senses the predetermined amount of "activity" (e.g. change of orientation) represented by the strike lines 152c (and set by the angler), a "strike" is reported to the angler in the form of an alert (e.g. a visual alert 154b as shown in FIG. 7, an audible alert, and/or a tactile alert). Visually, the angler is alerted when the waveform 150 meets (touches) or exceeds (crosses) the strike lines 152c. FIGS. 3, 4, and 21-24 show variations of where the strike lines 152c may be set. Variations showing the strike lines 152c closer to the central line 152a (e.g. FIG. 22) would alert the angler of a fish bite sooner (when the changes in orientation are smaller, perhaps even including the aggressive biting mentioned above) than variations showing the strike lines 152c at a middle distance to the central line 152a (e.g. FIGS. 4 and 21). Variations showing the strike lines 152c farther from the central line 152a (e.g. FIGS. 3, 23, and 24) would alert the angler of a fish bite later (when the changes in orientation are greater, representing to a greater certainty that the fish has been caught) than variations showing the strike lines 152c at a middle distance to the central line 152a (e.g. FIGS. 4 and 21). (As mentioned, the bite lines 152b are always between the central line 152a and respective (left/right) strike lines 152c.) The angler could base the point at which the strike tuning control 151c was set based on, for example, experimentation and/or experience.

As set forth, the transmitting module(s) 122 transmits the signal from the orientation sensor(s) 124 to the handheld device 108 (specifically to the receiving module(s) 133 thereof). The receiving module 133 (which may be a module integral with the handheld device 108) receives the signal and preferably displays the signal (or a variation thereof) as a waveform 150 on the display module(s) 134. The transmitting module(s) 132 may also send signals (e.g. start signals, stop signals, and reset signals) to the receiving module(s) 123 of the sensing device 102.

Alerts may be provided, for example, using at least one output module 136 of the handheld device 108. (It should be noted that the output module may include the display module 134 in addition to the shown output module 136 which, theoretically, could be an LED, a speaker for emitting sound, or a vibration motor to provide a tactile vibration.) Exemplary visual alerts, as shown in visual alert 154a (FIG. 6) and visual alert 154b (FIG. 7), may be textual (as shown) or graphically represented (e.g. photos, animation, or video). Another visual alert could be a light from an LED. Audible alerts may be in the form of a tone, buzzer, or a pre-recorded voice (e.g. "Fish On!," "You've got a nibble," "You've got a bite," "You better check your pole," or "He's taking line"). Tactile alerts may be, for example, vibrations. The alerts may also be a combination of visual, audible, and/or tactile alerts. The alerts may be context specific. For example, the alert may be a short "ding" for a bite, but a series of longer and repeated buzzes and vibration for a strike. The alerts may be set by the angler based on his preferences. For example, the angler may choose only a visual alert for a bite and choose visual, audible, and tactile alerts for the strike. The application 106 may come pre-loaded with a variety of alerts.

It should be noted that the when the waveform 150 meets (touches) or exceeds (crosses) the bite lines 152b, what is generally happening is that the signal (represented by the waveform 150) is being compared to the user adjustable bite tuning limit 154b (represented by the bite lines 152b) to determine whether the orientation of the pole 110 has changed enough (as determined by the user) so that the user should be alerted about a possible bite. It should be noted that the when the waveform 150 meets (touches) or exceeds (crosses) the strike lines 152c, what is generally happening is that the signal (represented by the waveform 150) is being compared to the user adjustable strike tuning limit 154c (represented by the strike lines 152c) to determine whether the orientation of the pole 110 has changed enough (as determined by the user) so that the user should be alerted about a possible strike.

The shown waveforms 150 are meant to be exemplary. More detailed waveforms such as those shown in FIGS. 19 and 20 may be used. In addition, the waveforms may be stored and/or downloaded (e.g. as a "recording") for future evaluation. Information regarding the tuning may also be saved alone or in conjunction with the waveforms. This may be useful to the angler to determine appropriate settings for future use of the multi-level programmable alerting system 100.

It should be noted that, although described as "an application 106 running on the handheld device 108," the application 106 and the handheld device 108 may be integrated as a special purpose device.

Flowchart

Figure 25:
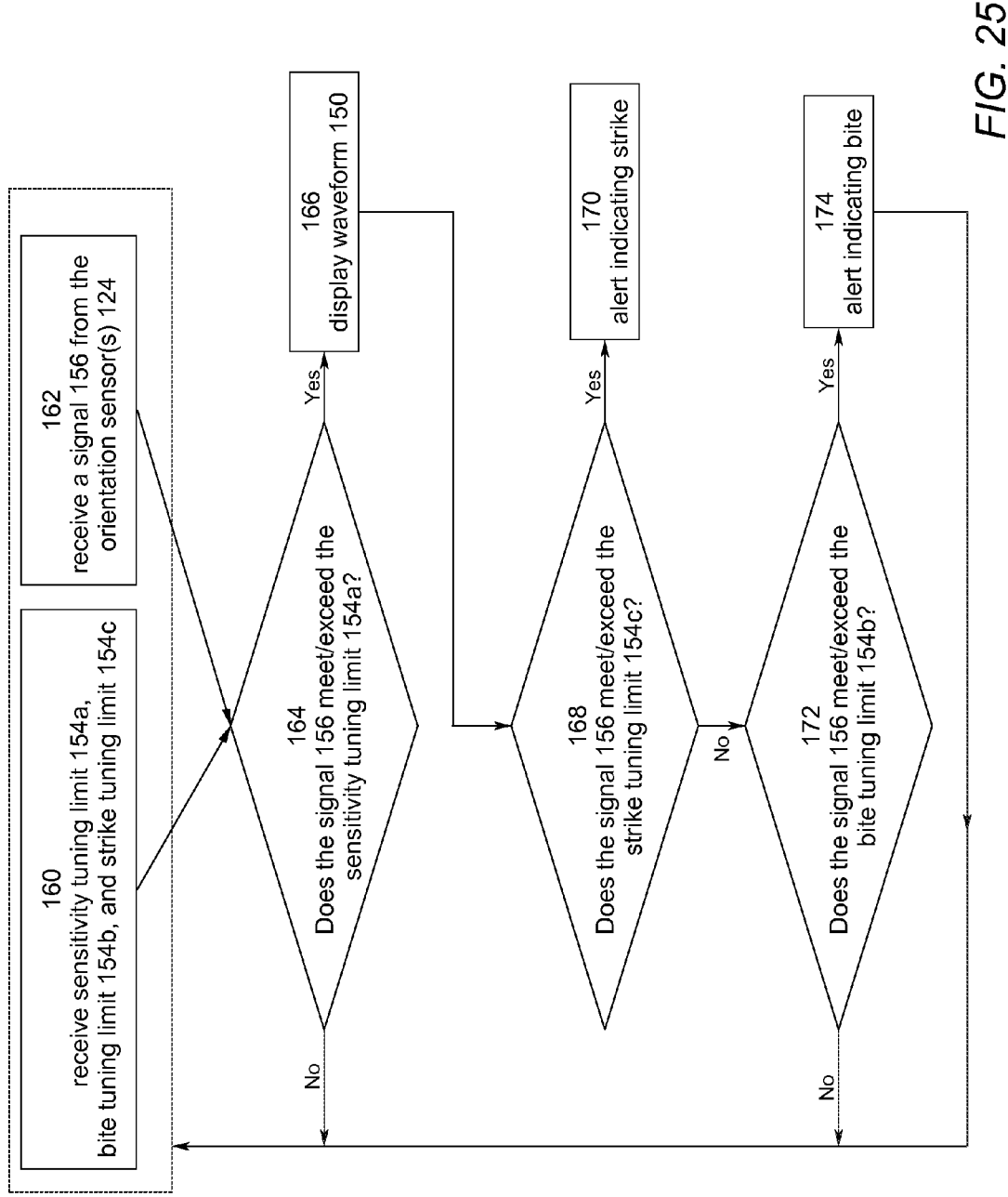
FIG. 25 is a flowchart of exemplary steps the application might implement.

The system 100 may be further understood in terms of the flowchart of FIG. 25 and the shown blocks (boxes) thereof.

Box 160 and box 162 can, together, be considered "monitoring." As shown in box 160, the application 106 receives a user input sensitivity tuning limit 154a, bite tuning limit 154b, and strike tuning limit 154c. The user manipulatable sensitivity tuning control 151a may be manipulated to adjust the sensitivity limit 154a (FIG. 25) (which is graphically represented and/or displayed on the display module(s) 134 as a central line 152a). The user manipulatable bite tuning control 151b may be manipulated to adjust the bite limit 154b (FIG. 25) (which is graphically represented and/or displayed on the display module(s) 134 as bite lines 152b). The user manipulatable strike tuning control 151c may be manipulated to adjust the strike limit 154c (FIG. 25) (which is graphically represented and/or displayed on the display module(s) 134 as strike lines 152c). As shown in box 162, the application 106 receives a signal 156 from the orientation sensor(s) 124. The signal 156 may be graphically represented and/or displayed on the display module(s) 134 as a waveform 150. It should be noted that the monitoring shown in box 160 does not have to be implemented as frequently as the monitoring shown in box 162 which is substantially ongoing.

Decision box 164 asks whether the signal 156 meets/exceeds the sensitivity tuning limit 154a? If the signal 156 meets/exceeds the sensitivity tuning limit 154a, the waveform 150 is displayed in box 166. If the signal 156 does not meet/exceed the sensitivity tuning limit 154a, the system 100 returns to monitoring as shown in box 160 and box 162.

Assuming that the signal 156 meets/exceeds the sensitivity tuning limit 154a and the waveform 150 is displayed, decision box 168 asks whether the signal 156 meets/exceeds the strike tuning limit 154c? If the signal 156 meets/exceeds the strike tuning limit 154c, an alert is sent indicating that there has been a strike as shown in box 170. If the signal 156 does not meet/exceed the strike tuning limit 154c, the system 100 proceeds to decision box 172.

Even though the signal 156 does not meet/exceed the strike tuning limit 154c, it might still meet/exceed the bite tuning limit 154b. Accordingly, decision box 172 asks whether the signal 156 meets/exceeds the bite tuning limit 154b? If the signal 156 meets/exceeds the bite tuning limit 154b, an alert is sent indicating that there has been a bite as shown in box 174. If the signal 156 does not meet/exceed the bite tuning limit 154b, the system 100 returns to monitoring as shown in box 160 and box 162.

FIG. 25 is a flow chart illustrating an exemplary method and/or system. It will be understood that each block of this flow chart, components of all or some of the blocks of this flow chart, and/or combinations of blocks in this flow chart, may be implemented by software (e.g. coding, software, computer program instructions, software programs, subprograms, or other series of computer-executable or processor-executable instructions), by hardware (e.g. processors, memory, gyro, transmitters/receivers), by firmware, and/or a combination of these forms. As an example, in the case of software, program instructions (computer-readable program code) may be loaded onto a handheld device to produce a machine, such that the instructions that execute on the handheld device create structures for implementing the functions specified in the flow chart block or blocks. These program instructions may also be stored in a memory that can direct a handheld device to function in a particular manner, such that the instructions stored in the memory produce an article of manufacture including instruction structures that implement the function specified in the flow chart block or blocks. The program instructions may also be loaded onto a computer to cause a series of operational steps to be performed on or by the handheld device to produce a computer implemented process such that the instructions that execute on the handheld device provide steps for implementing the functions specified in the flow chart block or blocks. The blocks of the flow chart support combinations of steps, structures, and/or modules for performing the specified functions. It will also be understood that each block of the flow chart, and combinations of blocks in the flow chart, may be divided and/or joined with other blocks of the flow chart without affecting the scope of the invention. This may result, for example, in program code being stored in whole on a single memory, or various components of program code being stored on more than one memory.

Additional Optional Features

After a strike has been sensed, the angler may be prompted (e.g. a visual prompt 156 as shown in FIG. 7) to communicate whether a fish has been caught. Optionally, the angler may be prompted to take a picture of his catch. The picture, a message, and/or location information (user input or provided by a GPS module of the handheld device) may be uploaded to a recording website (e.g. a "stringer" website that allows the anglers to keep track of their catches) and/or a contest website. The recording website may be integrated with other social media websites. The application 106 may allow the user to set up a profile to make submission to the contest website very simple.

The application 106 may be able to provide forecasts and information (e.g. weather forecasts, fishing forecasts, tides, sunrise/sunset, and moon information (overhead and underfoot)).

The application 106 may include a pause button so the angler can pause alerts for bites and/or strikes.

Preferably the sensing device 102 is able to float.

Distinction from Known Systems

Known systems (e.g. those shown and discussed herein including the Perkins '488 reference and the Perkins '461 reference) may have some of the general features of the system described herein. Among other differences, the system described herein uses a gyro as the orientation sensor(s) 124 that works in a manner completely distinct from the sensors used by the known systems. Further, the use of an application 106 on a handheld device 108 appears to be unique. Still further, the specific display of the signal output of the orientation sensor(s) 124 in conjunction with the graphical representation (the central line 152a) of the sensitivity limit 154a, the graphical representation (the bite lines 152b) of the bite limit 154b, and the graphical representation (the strike lines 152c) of the strike limit 154c is unique. The programmability and/or tunability (and the ease of the programmability and/or tunability) of the sensitivity limit 154a, bite limit 154b, and/or strike limit 154c is also unique. These and other features distinguish the system 100 described herein from known prior art.

It is to be understood that the inventions, examples, and embodiments described herein are not limited to particularly exemplified materials, methods, and/or structures. It is to be understood that the inventions, examples, and embodiments described herein are to be considered preferred inventions, examples, and embodiments whether specifically identified as such or not. The shown inventions, examples, and embodiments are preferred, but are not meant to be limiting unless specifically claimed, in which case they may limit the scope of that particular claim.

All references (including, but not limited to, foreign and/or domestic publications, patents, and patent applications) cited herein, whether supra or infra, are hereby incorporated by reference in their entirety.

The terms and expressions that have been employed in the foregoing specification are used as terms of description and not of limitation, and are not intended to exclude equivalents of the features shown and described. While the above is a complete description of selected embodiments of the present invention, it is possible to practice the invention using various alternatives, modifications, adaptations, variations, and/or combinations and their equivalents. It will be appreciated by those of ordinary skill in the art that any arrangement that is calculated to achieve the same purpose may be substituted for the specific embodiment shown. It is also to be understood that the following claims are intended to cover all of the generic and specific features of the invention herein described and all statements of the scope of the invention that, as a matter of language, might be said to fall therebetween.

What is claimed is:

1. A multi-level programmable alerting system for use with a fishing pole and a handheld device, said system comprising:
   (a) a sensing device associatable with the fishing pole, said sensing device having at least one orientation sensor for sensing the orientation of the fishing pole and translating it as a signal, and at least one transmitting module configured to transmit said signal;
   (b) an application associatable with the handheld device, said handheld device having at least one receiving module configured to receive said signal, and at least one display module, said signal graphically represented on said display module as a wave form;
   (c) a user manipulatable sensitivity tuning control by which a sensitivity limit may be set, said sensitivity limit graphically represented on said at least one display module by a sensitivity line;
   (d) a user manipulatable bite tuning control by which a bite limit may be set, said bite limit graphically represented on said at least one display module by a pair of bite lines, one bite line on each side of said sensitivity line; and (e) a user manipulatable strike tuning control by which a strike limit may be set, said strike limit graphically represented on said at least one display module by at least one strike line;

(f) wherein said system issues a bite alert if said signal meets said bite limit and issues a strike alert if said signal meets said strike limit.

2. The system of claim 1, wherein one bite line is on each side of said sensitivity line, and wherein said strike limit graphically represented on said at least one display module by a pair of strike lines, one strike line each side of said sensitivity line, each strike line separated from said sensitivity line by a respective bite line.

3. The system of claim 1, said bite alert being adjustable to issue sooner by manipulating said bite limit, such manipulation graphically represented on said at least one display module by moving at least one bite line of said pair of bite lines closer to said sensitivity line, and said bite alert being adjustable to issue later by manipulating said bite limit, such manipulation graphically represented on said at least one display module by moving said at least one bite line of said pair of bite lines farther from said sensitivity line.

4. The system of claim 1, said strike alert adjustable to issue sooner by manipulating said strike limit, such manipulation graphically represented on said at least one display module by moving said at least one strike line closer to said sensitivity line, and said strike alert adjustable to issue later by manipulating said strike limit, such manipulation graphically represented on said at least one display module by moving said at least one strike line farther from said sensitivity line.

5. The system of claim 1, said at least one orientation sensor being a gyro.

6. The system of claim 1, wherein said system issues a bite alert if said signal exceeds said bite limit and issues a strike alert if said signal exceeds said strike limit.

7. The system of claim 1, said bite alert being selected from the group of alerts consisting of an audible alert, a visual alert, and/or a tactile alert.

8. The system of claim 1, said strike alert being selected from the group of alerts consisting of an audible alert, a visual alert, and/or a tactile alert.

9. A multi-level programmable alerting system for use with a fishing pole and a handheld device, said system comprising:

(a) a sensing device associatable with the fishing pole, said sensing device having at least one orientation sensor for sensing the orientation of the fishing pole and translating it as a signal, and at least one transmitting module configured to transmit said signal;

(b) an application associatable with the handheld device, said handheld device having at least one receiving module configured to receive said signal, and at least one display module, said signal graphically represented on said display module as a wave form;

(c) a user manipulatable sensitivity tuning control by which a sensitivity limit may be set, said sensitivity limit graphically represented on said at least one display module by a sensitivity line;

(d) a user manipulatable bite tuning control by which a bite limit may be set, said bite limit graphically represented on said at least one display module by a pair of bite lines, one bite line on each side of said sensitivity line; and (e) a user manipulatable strike tuning control by which a strike limit may be set, said strike limit graphically represented on said at least one display module by a pair of strike lines, one strike line each side of said sensitivity line, each strike line separated from said sensitivity line by a respective bite line;

(f) wherein said system issues a bite alert if said signal meets said bite limit and issues a strike alert if said signal meets said strike limit.

10. The system of claim 9, said bite alert being adjustable to issue sooner by manipulating said bite limit, such manipulation graphically represented on said at least one display module by moving said pair of bite lines closer to said sensitivity line, and said bite alert being adjustable to issue later by manipulating said bite limit, such manipulation graphically represented on said at least one display module by moving said pair of bite lines farther from said sensitivity line.

11. The system of claim 9, said strike alert adjustable to issue sooner by manipulating said strike limit, such manipulation graphically represented on said at least one display module by moving said pair of strike lines closer to said sensitivity line, and said strike alert adjustable to issue later by manipulating said strike limit, such manipulation graphically represented on said at least one display module by moving said pair of strike lines farther from said sensitivity line.

12. The system of claim 9, said at least one orientation sensor being a gyro.

13. The system of claim 9, wherein said system issues a bite alert if said signal exceeds said bite limit and issues a strike alert if said signal exceeds said strike limit.

14. The system of claim 9, said bite alert being selected from the group of alerts consisting of an audible alert, a visual alert, and/or a tactile alert.

15. The system of claim 9, said strike alert being selected from the group of alerts consisting of an audible alert, a visual alert, and/or a tactile alert.

16. A multi-level programmable alerting system for use with a fishing pole and a handheld device, said system comprising:

(a) a sensing device associatable with the fishing pole, said sensing device having at least one gyro orientation sensor for sensing the orientation of the fishing pole and translating it as a signal, and at least one transmitting module configured to transmit said signal;

(b) an application associatable with the handheld device, said handheld device having at least one receiving module configured to receive said signal, and at least one display module, said signal graphically represented on said display module as a wave form;

(c) a user manipulatable sensitivity tuning control by which a sensitivity limit may be set, said sensitivity limit graphically represented on said at least one display module by a sensitivity line;

(d) a user manipulatable bite tuning control by which a bite limit may be set, said bite limit graphically represented on said at least one display module by a pair of bite lines, one bite line on each side of said sensitivity line, wherein said system issues a bite alert if said signal meets said bite limit, and wherein said bite alert is adjustable to issue sooner by manipulating said bite limit, such manipulation graphically represented on said at least one display module by moving said pair of bite lines closer to said sensitivity line, and said bite alert is adjustable to issue later by manipulating said bite limit, such manipulation graphically represented on said at least one display module by moving said pair of bite lines farther from said sensitivity line; and (e) a user manipulatable strike tuning control by which a strike limit may be set, said strike limit graphically represented on said at least one display module by a pair of strike lines, one strike line each side of said sensitivity line, each strike line separated from said sensitivity line by a respective bite line, wherein said system issues a strike alert if said signal meets said strike limit, and wherein said strike alert is adjustable to issue sooner by manipulating said strike limit, such manipulation graphically represented on said at least one display module by moving said pair of strike lines closer to said sensitivity line, and said strike alert is adjustable to issue later by manipulating said strike limit, such manipulation graphically represented on said at least one display module by moving said pair of strike lines farther from said sensitivity line.

17. The system of claim 16, wherein said system issues a bite alert if said signal exceeds said bite limit and issues a strike alert if said signal exceeds said strike limit.

18. The system of claim 16, said bite alert being selected from the group of alerts consisting of an audible alert, a visual alert, and/or a tactile alert.

19. The system of claim 16, said strike alert being selected from the group of alerts consisting of an audible alert, a visual alert, and/or a tactile alert.

* * * * *